(12) United States Patent
Barkenhagen et al.

(10) Patent No.: US 12,448,572 B2
(45) Date of Patent: *Oct. 21, 2025

(54) CARBON CAPTURE SYSTEM

(71) Applicant: Plastics Decoded LLC, Norco, CA (US)

(72) Inventors: Michael Barkenhagen, Norco, CA (US); Robert R Mahoney, Norco, CA (US)

(73) Assignee: Plastics Decoded LLC, Norco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,047

(22) Filed: Mar. 21, 2024

(65) Prior Publication Data
US 2024/0263079 A1 Aug. 8, 2024

Related U.S. Application Data

(63) Continuation of application No. 18/318,337, filed as application No. PCT/US2023/067046 on May 16, 2023, now Pat. No. 12,049,590.

(60) Provisional application No. 63/342,185, filed on May 16, 2022.

(51) Int. Cl.
| | |
|---|---|
| C10B 53/07 | (2006.01) |
| B09B 3/40 | (2022.01) |
| C10B 49/14 | (2006.01) |
| C10B 57/02 | (2006.01) |
| C10B 57/14 | (2006.01) |
| C10G 1/02 | (2006.01) |
| B09B 101/75 | (2022.01) |

(52) U.S. Cl.
CPC ............... *C10B 53/07* (2013.01); *B09B 3/40* (2022.01); *C10B 49/14* (2013.01); *C10B 57/02* (2013.01); *C10B 57/14* (2013.01); *C10G 1/02* (2013.01); *B09B 2101/75* (2022.01); *C10G 2300/1003* (2013.01)

(58) Field of Classification Search
None
See application file for complete search history.

(56) References Cited

U.S. PATENT DOCUMENTS

| | | | | |
|---|---|---|---|---|
| 3,977,960 | A | * | 8/1976 | Stout ........................ C10B 49/14 201/11 |
| 4,225,392 | A | * | 9/1980 | Taylor ....................... C10B 1/04 48/85 |
| 5,085,738 | A | * | 2/1992 | Harris ..................... C10B 49/14 201/3 |

(Continued)

*Primary Examiner* — Jonathan Luke Pilcher

(57) ABSTRACT

A method for processing plastics includes receiving input plastics to be processed. The method further includes driving the input plastics through a reactor chamber having at least two zones each containing heated fluid that is heated to greater temperatures in a subsequent zone such that remaining plastics of the input plastics are exposed to increasingly greater temperatures in each zone of the reactor chamber. The method also includes collecting condensable vapors that flow out of the at least two zones of the reactor chamber. The method further includes condensing the condensable vapors into a liquid condensate. The method also includes removing biochar products from the heated fluid. The method further includes removing contaminants from the reactor chamber.

20 Claims, 8 Drawing Sheets

(56) References Cited

U.S. PATENT DOCUMENTS

| | | | | | |
|---|---|---|---|---|---|
| 5,979,033 | A | * | 11/1999 | Chang | C22B 7/001 |
| | | | | | 241/23 |
| 6,089,479 | A | * | 7/2000 | Chang | B03B 9/061 |
| | | | | | 241/23 |
| 8,506,765 | B2 | * | 8/2013 | Benham | C10G 1/02 |
| | | | | | 201/11 |
| 9,216,905 | B2 | * | 12/2015 | Presswood, Jr. | C22B 61/00 |
| 9,909,067 | B2 | * | 3/2018 | Daugaard | C10C 5/00 |
| 10,316,375 | B2 | * | 6/2019 | Presswood, Jr. | C22B 61/00 |
| 10,427,192 | B2 | * | 10/2019 | Presswood, Jr. | B09B 3/40 |
| 10,865,345 | B2 | * | 12/2020 | Riedewald | C10B 49/14 |
| 10,953,444 | B2 | * | 3/2021 | Riedewald | H01M 10/54 |
| 10,994,315 | B2 | * | 5/2021 | Presswood, Jr. | B01D 5/0069 |
| 11,359,253 | B2 | * | 6/2022 | Presswood, Jr. | C10B 1/02 |
| 12,049,590 | B1 | * | 7/2024 | Barkenhagen | C10B 53/07 |
| 2003/0010266 | A1 | * | 1/2003 | Ballantine | C10B 47/44 |
| | | | | | 110/229 |
| 2010/0228062 | A1 | * | 9/2010 | Babicki | C10B 53/02 |
| | | | | | 422/187 |
| 2012/0304822 | A1 | * | 12/2012 | Presswood, Jr. | C01B 32/05 |
| | | | | | 423/578.4 |
| 2014/0183022 | A1 | * | 7/2014 | Daugaard | C10B 47/02 |
| | | | | | 202/262 |
| 2015/0184079 | A1 | * | 7/2015 | Riedewald | C10B 31/06 |
| | | | | | 201/25 |
| 2016/0030987 | A1 | * | 2/2016 | Riedewald | C10B 53/07 |
| | | | | | 422/184.1 |
| 2016/0102374 | A1 | * | 4/2016 | Presswood, Jr. | C01B 32/05 |
| | | | | | 75/500 |
| 2017/0326603 | A1 | * | 11/2017 | Presswood, Jr. | C01B 21/02 |
| 2018/0050372 | A9 | * | 2/2018 | Presswood, Jr. | B01D 21/26 |
| 2019/0284651 | A1 | * | 9/2019 | Presswood, Jr. | C22B 15/0052 |
| 2020/0030861 | A1 | * | 1/2020 | Presswood, Jr. | F42B 33/06 |
| 2022/0282345 | A1 | * | 9/2022 | Presswood, Jr. | C01B 17/033 |

* cited by examiner

CARBON CAPTURE SYSTEM

CROSS-REFERENCE TO RELATED APPLICATIONS

This application is a continuation, and claims the benefit and priority, of U.S. Non-Provisional patent application Ser. No. 18/318,337, titled CARBON CAPTURE SYSTEM and filed on May 16, 2023, which claims the benefit and priority of PCT Patent Application No. PCT/US23/67046, titled CARBON CAPTURE SYSTEM and filed on May 16, 2023, which claims the benefit and priority of U.S. Provisional Application No. 63/342,185, titled CARBON CAPTURE SYSTEM and filed on May 16, 2022, the entire contents of all being hereby incorporated by reference in their entirety.

BACKGROUND

1. Field

The present invention relates to processes for processing plastics and, more particularly, to processes for processing mixed plastic waste into petroleum and petroleum products at an industrial scale while significantly reducing the production of hazardous byproducts.

2. Description of the Related Art

Plastic waste has become an environmental crisis of unprecedented scale. An estimated 400 million tons of plastic was produced in 2022 and this figure is expected to continue increasing at 10% per year. While plastics are presented as safe and recyclable by manufacturers, less than 10% of plastic waste is actually recycled, leaving hundreds of millions of tons per year to end up in landfills and oceans. Microplastics, tiny pieces of plastic small enough to be ingested, are now found in bodies of humans and animals, in food eaten by humans, in drinking water, and the air in and around human settlements. While the health effects of these microplastics on humans and wildlife are not yet fully understood, plastic pollution has been linked to cancer, infertility, gastrointestinal issues, liver damage, disruption of the endocrine system, and developmental disorders. Additionally, oceanic plastics have been identified as a key driver of ocean acidification, which threatens marine ecosystems and global food security. These issues, along with claims of safety and recyclability by plastics manufacturers and petrochemical companies, have not gone unnoticed by governments: in April 2022, the Attorney General for the State of California launched an investigation into whether fossil fuel companies broke the law by perpetuating myths about plastics recycling.

There is no existing commercially viable method for processing relatively high volumes of mixed plastic waste. Existing recycling methods are type-specific, requiring that plastics be sorted and cleaned prior to processing. As a result, existing plastic recycling methods incur significant cost and effort in pre-treatment to ensure the recycled plastic feedstocks are adequately sorted and cleaned prior to processing. Most recycling methods are relatively energy intensive, requiring significant amounts of external energy to drive the recycling process. The relatively high cost of pre-treatment, separation, and processing, combined with an end-product of reduced quality relative to new plastics, generates insufficient commercial incentive for the effective management of the plastic waste stream using existing recycling methods.

Thus, there is a need in the art for economically feasible systems and methods for processing plastics of multiple types into an end-product of significant value.

SUMMARY

Described herein is a method for processing plastics. The method includes receiving input plastics to be processed. The method further includes driving the input plastics through a reactor chamber having at least two zones each containing heated fluid that is heated to greater temperatures in a subsequent zone such that remaining plastics of the input plastics are exposed to increasingly greater temperatures in each zone of the reactor chamber. The method also includes collecting condensable vapors that flow out of the at least two zones of the reactor chamber. The method further includes condensing the condensable vapors into a liquid condensate. The method also includes removing biochar products from the heated fluid. The method further includes removing contaminants from the reactor chamber.

In any of the foregoing embodiments, the heated fluid within the reactor chamber includes a molten salt.

In any of the foregoing embodiments, the at least two zones include a first zone in which the fluid is heated to a temperature of 350 degrees Fahrenheit (350 degrees F., 177 degrees Celsius (177 degrees C.)) or less, a last zone in which the fluid is heated to a temperature of at least 800 degrees F. (427 degrees C.), and a middle zone in which the fluid is heated to a temperature that is between 250 degrees F. and 900 degrees F. (between 121 degrees C. and 482 degrees C.).

In any of the foregoing embodiments, the middle zone includes a second zone in which the fluid is heated to a temperature that is between 300 degrees F. and 450 degrees F. (between 149 degrees C. and 232 degrees C.), a third zone in which the fluid is heated to a temperature that is between 450 degrees F. and 650 degrees F. (between 232 degrees C. and 343 degrees C.), and a fourth zone in which the fluid is heated to a temperature that is between 650 degrees F. and 850 degrees F. (between 343 degrees C. and 454 degrees C.).

Any of the foregoing embodiments may further include collecting non-condensable gases and routing the non-condensable gases to at least one of a generator to generate electricity or to at least one burner to provide thermal energy to heat the heated fluid.

Any of the foregoing embodiments may further include detecting temperatures of the heated fluid in multiple locations in the reactor chamber; and controlling heating elements to increase or decrease a temperature of the heated fluid based on the detected temperatures of the heated fluid.

Any of the foregoing embodiments may further include detecting data corresponding to a status of the reactor chamber, components within the reactor chamber, or components coupled to the reactor chamber; monitoring a status of the reactor chamber, components within the reactor chamber, or components coupled to the reactor chamber based on the detected data; and adjusting adjustable parameters of the reactor chamber, components within the reactor chamber, or components coupled to the reactor chamber based on the monitored status.

Any of the foregoing embodiments may further include pelletizing the input plastics into plastic pellets before driving the input plastics through the reactor chamber.

In any of the foregoing embodiments, the input plastics include a mix of multiple types of plastics.

Also disclosed is a system for processing plastics. The system includes a reactor chamber configured to receive input plastics, having an input end designed to receive the input plastics and an output end opposite the input end, and being at least partially filled with a heated fluid such that the heated fluid has a greater temperature at the output end than at the input end, the heated fluid being heated to temperatures sufficiently great so as to cause pyrolysis of the input plastics to at least partially convert the input plastics into condensable vapors. The system also includes a condenser configured to receive the condensable vapors from the reactor chamber and to condense the condensable vapors into a liquid condensate.

In any of the foregoing embodiments, the reactor chamber at least one of includes or defines a port configured to receive biochar products and to separate the biochar products from the reactor chamber.

In any of the foregoing embodiments, the reactor chamber includes at least three zones including a first zone in which the fluid is heated to a temperature of 350 degrees Fahrenheit (350 degrees F., 177 degrees Celsius (177 degrees C.)) or less, a last zone in which the fluid is heated to a temperature of at least 800 degrees F. (427 degrees C.), and a middle zone in which the fluid is heated to a temperature that is between 250 degrees F. and 900 degrees F. (between 121 degrees C. and 482 degrees C.).

In any of the foregoing embodiments, the middle zone includes a second zone in which the fluid is heated to a temperature that is between 300 degrees F. and 450 degrees F. (between 149 degrees C. and 232 degrees C.), a third zone in which the fluid is heated to a temperature that is between 450 degrees F. and 650 degrees F. (between 232 degrees C. and 343 degrees C.), and a fourth zone in which the fluid is heated to a temperature that is between 650 degrees F. and 850 degrees F. (between 343 degrees C. and 454 degrees C.).

Any of the foregoing embodiments may further include a reactor auger located in and extending along a length of the reactor chamber, the reactor auger being configured to drive the input plastics through the reactor chamber.

In any of the foregoing embodiments, the reactor auger has a top and a bottom, and a top surface of the heated fluid is configured to be located between the top and the bottom of the reactor auger.

Any of the foregoing embodiments may further include a mesh cage configured to at least partially surround the reactor auger at locations of the reactor auger located above the top surface of the heated fluid such that the input plastics remain between the mesh cage and the top surface of the heated fluid such that the reactor auger continues driving solid plastics through the reactor chamber.

Any of the foregoing embodiments may further include a contaminant auger located towards a bottom of the reactor chamber and configured to drive contaminants through the reactor chamber to a location from which they may be removed from the reactor chamber.

Any of the foregoing embodiments may further include at least one of: a generator configured to convert non-condensable gases generated by the pyrolysis into electricity, and electric heating elements configured to convert the electricity from the generator into thermal energy to heat the heated fluid; or fuel-powered heating elements configured to burn the non-condensable gases to generate the thermal energy to heat the heated fluid.

Any of the foregoing embodiments may further include: at least one sensor configured to detect data corresponding to the system; an input auger configured to drive the input plastics into the reactor chamber and having an adjustable input auger rate to adjust a feed rate of the input plastics into the reactor chamber; a reactor auger located in and extending along a length of the reactor chamber, the reactor auger being configured to drive the input plastics through the reactor chamber and having an adjustable reactor auger rate to adjust a speed at which the input plastics are driven through the reactor chamber; and a controller coupled to the at least one sensor, the input auger, and the reactor auger and configured to adjust at least one of the adjustable input auger rate or the adjustable reactor auger rate based on the detected data.

Also disclosed is a system for processing plastics. The system includes a reactor chamber configured to receive input plastics, having an input end designed to receive the input plastics and an output end opposite the input end, and being at least partially filled with a heated fluid that is heated to temperatures sufficiently great so as to cause pyrolysis of the input plastics to at least partially convert the input plastics into condensable vapors. The system further includes a reactor auger located in and extending along a length of the reactor chamber, the reactor auger being configured to drive the input plastics through the reactor chamber. The system further includes a condenser configured to receive the condensable vapors from the reactor chamber and to condense the condensable vapors into a liquid condensate.

In any of the foregoing embodiments, the heated fluid includes a molten salt such that: a first contaminant having a first density that is greater than a salt density of the molten salt falls through the molten salt towards a bottom of the reactor chamber; and a second contaminant having a second density that is less than the salt density floats above the molten salt and is driven through the reactor chamber by the reactor auger.

BRIEF DESCRIPTION OF THE DRAWINGS

Other systems, methods, features, and advantages of the present disclosure will be or will become apparent to one of ordinary skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

The present disclosure provides systems and methods for processing plastic waste that includes a mixture of multiple types of plastic. In particular, the systems and methods convert the mixed plastic waste into petroleum and petroleum products (e.g., in oil form), biochar (or "char"), and heavy contaminants. The petroleum and petroleum products may be used in a similar manner as any other petroleum product: it may be converted to fuel to generate energy, it may be converted into plastics or other products, or the like. Biochar may be used, for example, in water filtration systems, sanitation, composting, animal feed, waste management, soil amendments, or the like. Uses may be found for some or all of the heavy contaminants, or some or all of the heavy contaminants may be properly disposed of.

The present systems and methods provide various benefits and advantages over conventional plastic processing methods. An exemplary benefit is that the present systems are designed to receive plastic feed that includes a broad mixture of plastic types as an input, reducing or eliminating any need for pre-processing sorting, thus reducing the complexity and cost of processing. Another benefit is that the petroleum and petroleum products generated by the system have commercial value, which provides significant economic incentive to process waste plastics. This in turn provides the benefit of reducing worldwide plastic waste, and leaving a cleaner planet for future generations. The system also beneficially generates biochar which has significant commercial and agricultural value, proving further incentive for plastic processing. The system also generates additional byproducts, some of which can be used as inputs to the system (e.g., for sanitization, for power generation, etc.), thus reducing the cost of operating the system.

Figure 1:
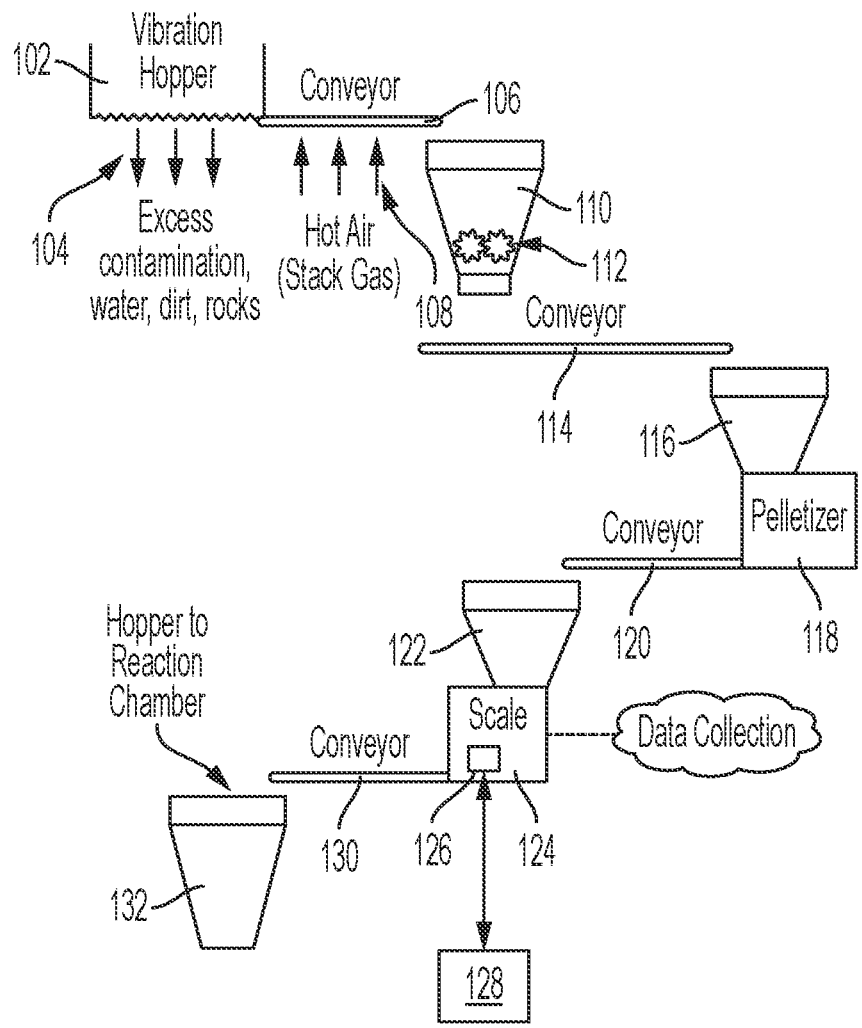
FIG. 1 is a system diagram illustrating various components of a system for pre-conditioning mixed plastics before processing the plastics intro petroleum and petroleum products, according to some embodiments of the present disclosure.
Figure 2:
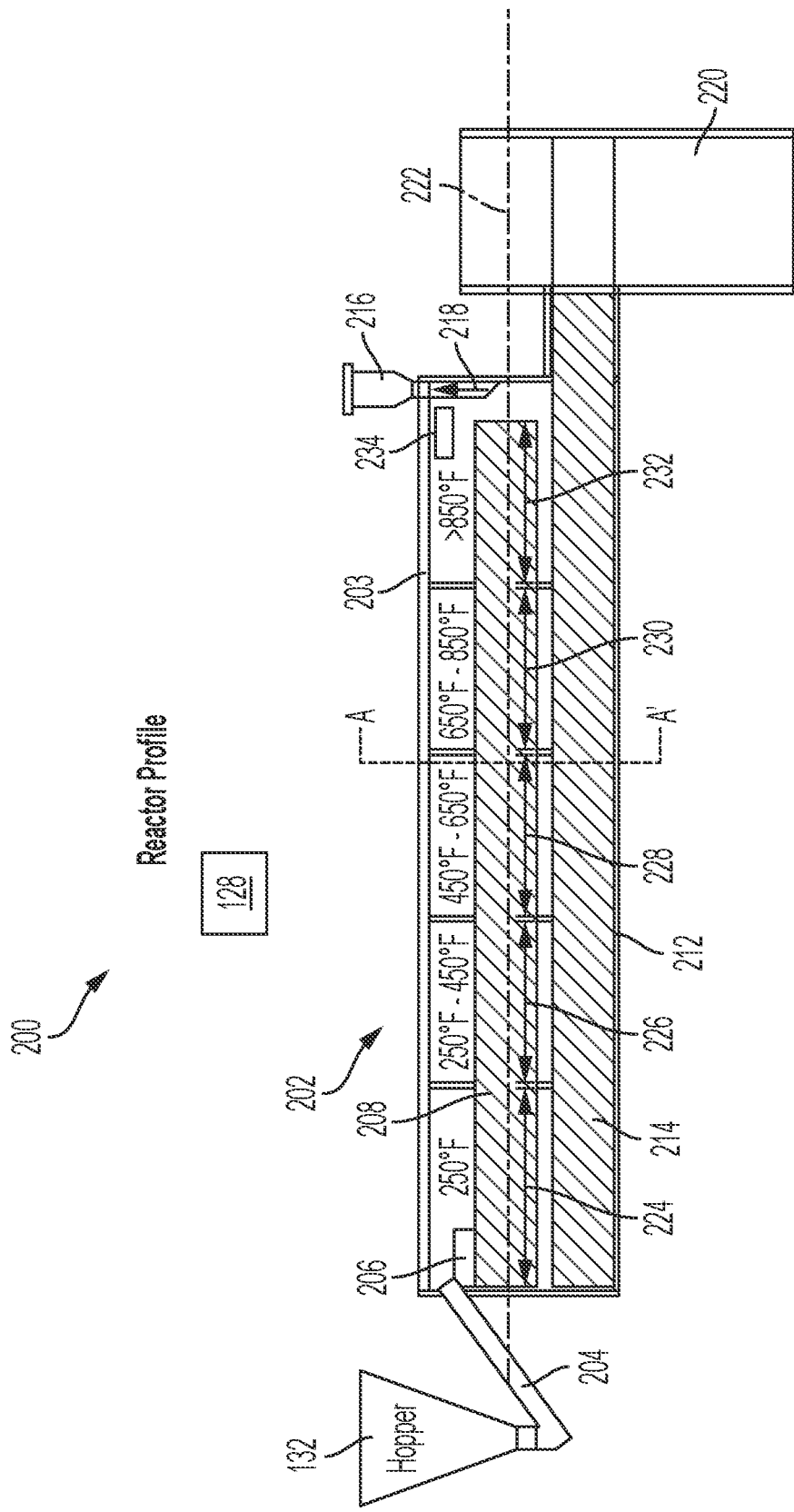
FIG. 2 is a cross-sectional side view of a system for processing mixed plastic materials into petroleum and petroleum products, according to some embodiments of the present disclosure.
Figure 3:
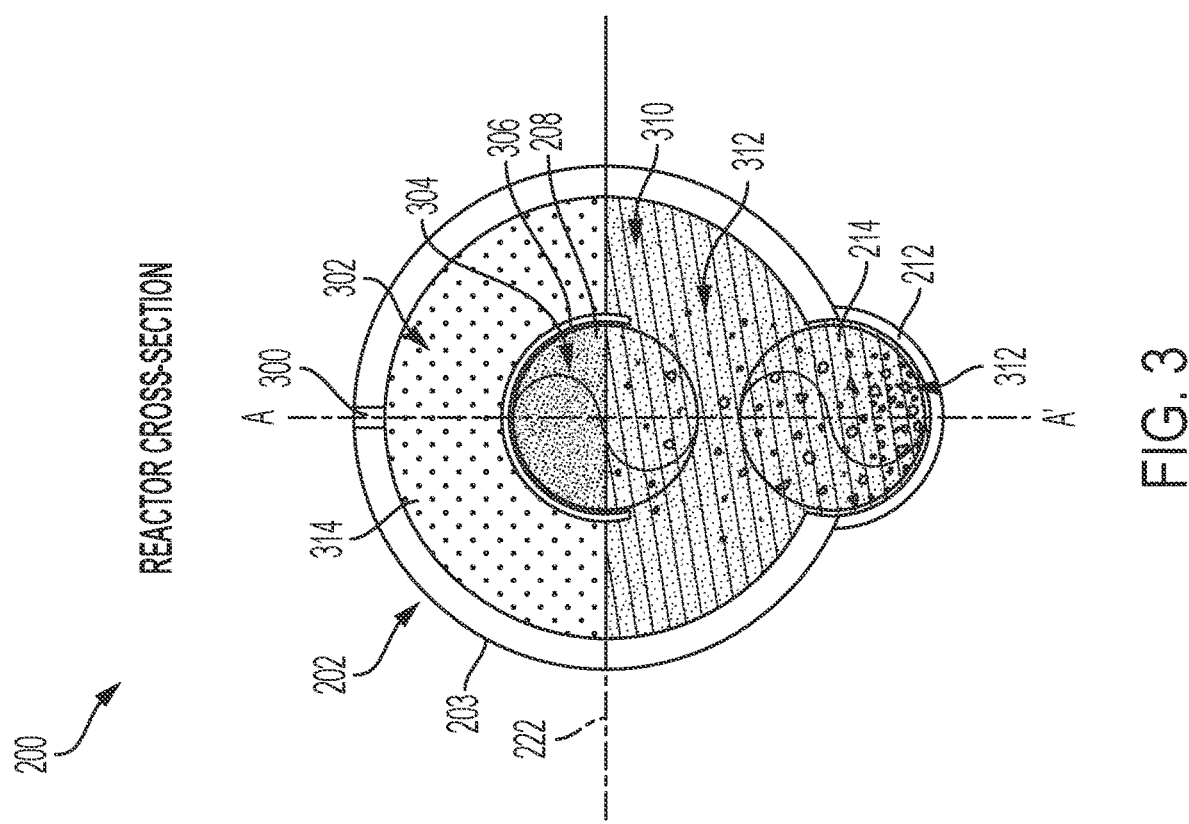
FIG. 3 is a cross-sectional front view of a reactor chamber of the system of FIG. 2, according to some embodiments of the present disclosure.

Referring generally to FIGS. 1-3, an exemplary plastic processing system 200 includes a hopper 132 which receives pre-treated plastic waste and provides the plastic waste to a reactor chamber 202. The reactor chamber 202 includes a heated fluid 310 (e.g., fluidized salt) having multiple zones 224, 226, 228, 230, 232 therein that are each designed to heat the fluid 310 to a predetermined temperature range such that each subsequent zone 224, 226, 228, 230, 232 has fluid 310 of a greater temperature range than the previous zone 224, 226, 228, 230, 232. A reactor auger 208 may urge the plastic waste through the zones 224, 226, 228, 230, 232 of the reactor chamber 202. As the plastic waste encounters fluid 310 having a temperature that causes pyrolysis of the specific type of plastic, the plastic waste decomposes into liquids, condensable gases (which may also be referred to as "vapor" or "vapors"), and non-condensable gases (or simply "gas" or "gases") composed of petroleum and petroleum products. The vapors may be removed from the reactor chamber 202 and condensed into petroleum and petroleum products. Lighter contaminants may be converted to biochar and removed from the reactor chamber 202, and heavy contaminants may also be removed from the reactor chamber 202 and utilized/sold or properly discarded. The system 200 may be designed to receive a mixture of a broad range of plastic types. In some embodiments, the system 200 may be designed to receive a mixture of any types of plastics without issues. In some embodiments, the system 200 may be designed to receive a mixture of any types of plastics with the exception of tires and waste electrical and electronic equipment (WEEE).

General Description of Systems and Methods

With continued reference generally to FIGS. 1-3, discussion will now turn to a general description of the systems and methods for processing mixed plastics into usable byproducts. A key aspect of the present disclosure is the use of pyrolysis via a heated fluid bed reactor to recover useful petroleum and petroleum products from mixed plastics (e.g., plastic waste of a mixture of multiple plastic types such as polyethylene terephthalate (PET), high-density polyethylene (HDPE), polyvinyl chloride (PVC), low-density polyethylene (LDPE), polypropylene (PP), or the like) which are heated in the heated fluid bed reactor 202 (which may also be referred to as a "reactor chamber"). The reactor chamber 202 may include molten salt as the heated fluid 310; however, in some embodiments, additional or alternative fluids may be used in addition to, or in place of, the molten salt. Where used herein, "salt" may refer to any chemical compound formed from the reaction of an acid with a base, with all or part of the hydrogen of the acid replaced by a metal or other cation. For example, salt may refer to simple salts (e.g., sodium chloride), acidic salts (e.g., sodium carbonate and ammonium chloride), basic salts (e.g., sodium acetate, potassium cyanide, and zinc chloride hydroxide), neutral salts (e.g., potassium chlorate, calcium phosphate, and sodium nitrate), or the like. Some salts may be preferred in some embodiments due to various desirable or undesirable properties of the various salts such as melting temperatures, reactions between salts and other compounds, or the like. In some embodiments, "salt" may refer to any one or more specific compound known as salt, such as sodium chloride. In some embodiments, the heated fluid 310 may include any material that can reach the desired temperatures described below without chemically reacting with materials with which it comes in contact.

Pyrolysis is the thermal decomposition of materials at elevated temperatures and may often be performed in an inert (oxygen-free) atmosphere. Pyrolysis generally involves a change of chemical composition of matter. In that regard, the mixed plastics may be heated in the reactor chamber 202 until they experience pyrolysis and decompose from the various types of input plastic to output compounds as discussed further below.

In some embodiments, a blanket of inert gas (e.g., nitrogen or another gas) may be employed within a volume defined by the reactor chamber 202 to initially create a positive-pressure, oxygen-free atmosphere within the reactor chamber 202 during process start-up. Gases and vapors produced by the ongoing pyrolysis reaction may maintain the positive pressure within the reactor chamber 202 after start-up and during steady-state operation of the processing process. In some embodiments, a pressure sensor 234 and controller 128 coupled thereto may monitor pressures within the reactor chamber 202, and the controller 128 may control an additional component(s) to add nitrogen to the reactor chamber 202 to supplement pressure should the detected pressure fall below a predetermined threshold pressure. The predetermined threshold pressure may correspond to a pressure within the reactor chamber 202 below which undesirable operation of the system 200 may occur. For example, if the pressure within the reactor chamber 202 drops below the predetermined threshold pressure, then oxygen may flow into the reactor chamber 202, thus disturbing the pyrolysis process or creating a potential for undesirable combustion within the reactor chamber 202.

Where used herein, the controller 128 may include any controller or processor capable of performing logic functions. For example, the controller 128 may include an application-specific integrated circuit (ASIC), a general-purpose processor, a field programmable gate array (FPGA), a PID Controller (Proportional Integral Derivative controller), any combination of discrete logic devices that perform logic functions, or the like. In some embodiments, the controller 128 may further include a memory that stores instructions usable by the controller 128 to perform logic functions, stores information or data as requested by the controller 128, or the like. The controller 128 may be housed within one or more component of the system 200, may be coupled to one or more component of the system 200, may include remote functionality (e.g., by providing cloud-based processing), or any combination thereof. For example, the controller 128 may be included as part of a separate dedicated recording and monitoring system that is connected or coupled to at least one of the system 100 or the system 200.

Controlling the reactor chamber 202 such that a maximum temperature therewithin is about 1000 degrees Fahrenheit (1000 degrees F., 537.8 degrees Celsius (C)) assures decomposition of all plastics. Where used herein, "about" refers to the referenced value plus or minus 10 percent of the referenced value. The pyrolysis process thermally decomposes the plastics to produce a mixture of petroleum, petroleum products, and other products (e.g., condensable petroleum-related vapors, non-condensable petroleum-related gases, biochar, and non-petroleum contaminants such as metals). The condensable vapors produced by the pyrolysis process may be condensed (e.g., into sour oil, sweet oil, or other petroleum or petroleum products) and then made available for reuse (e.g., burned as fuel, converted to gasoline, used as raw material to make other products, or the like). The pyrolysis process has several factors that influence the characteristics of the final product(s). For example, factors that influence the final product(s) may include temperature, residence time (i.e., an amount of time that the material spends exposed to temperatures within a specific zone or within the reactor chamber 202), speed (e.g., speed at which the input plastics are moved through the reactor chamber 202), temperatures and temperature ranges to which the input plastics are exposed, specific catalysts used in the pyrolysis, duration of time which the input plastics are exposed to pyrolysis-inducing temperatures or the like. The systems and methods may be designed to facilitate adjustments to these factors as needed to favor production of certain product(s) over others. Stated differently, the systems and methods herein may be tuned by changing the speed, temperature ranges, and specific catalysts of the pyrolysis to obtain target output product(s). For example, the controller 128 may change the speed of various augers, heating elements, and catalyst input devices (e.g., nozzles or valves) of the system 200.

Each type of plastic may have a different temperature or temperature range at which melting of the plastic may occur, at which the plastic material may boil, and at which pyrolysis of the specific type of plastic occurs. The reactor chamber 202 is designed to have multiple zones 224, 226, 228, 230, 232, or stages, that each expose the plastic to a temperature or a range of temperatures that correspond to the various melting, boiling point, and pyrolysis temperatures of the plastics, and each subsequent zone 224, 226, 228, 230, 232 may expose the plastic to a greater temperature range than the previous zone. This attribute allows for removal of the vapors at relatively low temperatures (i.e., temperatures which may be only slightly greater than the temperature at which the plastic experiences pyrolysis), causing the process to create more condensable vapors and less non-condensable gasses than if the input plastic is exposed to maximum temperatures immediately. This is a beneficial result because the condensable vapors may be condensed and sold as relatively high-quality petroleum. Stated differently, the sooner vapors are removed from exposure to increasing temperatures, the greater the ratio of condensable vapors to non-condensable gases will be. Because the temperatures in the subsequent zones 224, 226, 228, 230, 232 become progressively hotter, the plastics that have already been removed in earlier zones are not subject to the hotter temperatures of the later zones 224, 226, 228, 230, 232. Similarly, chemicals released by plastics that experience pyrolysis at higher temperatures will not react with chemicals that have already been removed in the form of vapor from the plastics that have been depolymerized at lower temperatures. This zoning effect limits the interaction between the chemical components of the different types of plastics and enables the processing of mixed plastic waste without the need for pre-sorting the input plastic by plastic type.

Importantly, the systems and methods of the present disclosure have been shown to be effective for combinations of plastic materials which may even include fiberglass along with multiple additional types of plastics. For example, polyvinyl chloride (PVC) and polyurethane are often melted together to yield a composite with desirable physical and/or mechanical properties (e.g., tensile strength, yield strength, density, melting temperature, or the like). The systems and methods of the present disclosure can process a substance that contains both of these types of plastic (PVC and polyurethane) without requiring separation of the different types of plastic, or even separation of the fiberglass, before processing. The successive zones of the reactor chamber described herein enable these plastic compositions to be decomposed without undue generation of ash and harmful airborne pollutants, as plastics with a lower pyrolysis threshold will be processed in an earlier zone and plastics with a greater pyrolysis threshold will be processed in a later, hotter zone.

Additional details regarding the systems and methods of processing mixed plastics are provided in greater detail below, and these details include discussion of pre-conditioning, removal of petroleum, removal of additional petroleum products, and removal of char.

Pre-Conditioning

Certain steps can be beneficial in preparing materials for processing in a reactor, such as the rector chamber 202 of FIG. 2. Referring now to FIG. 1, a pre-conditioning system 100 may include a vibration hopper 102 or other component which may be used to remove excess contaminants 104 (e.g., water, dirt, rocks, and other debris) from a collection of input plastic, which may include a mixture of multiple types of plastic. The input plastic may then be passed through hot air 108 (e.g., on a conveyor 106) to clean the input plastic. However, additional or alternative means for cleaning the input plastic may be contemplated without departing from the scope of the present disclosure. As will be discussed, some of this hot air may be provided by later stages in the process as a byproduct of burning collected non-condensable gases (or even collected condensable vapors). For example, the hot air 108 may include flue gases created during combustion of non-condensable gases (e.g., in a separate combustion stage). These non-condensable gases may include relatively light hydrocarbons (e.g., ethane, methane, etc.) which are severed from the ends of larger molecules and which burn relatively cleanly (i.e., producing flue gases containing mainly carbon dioxide and water vapor). The hot air 108 may be a byproduct of heating the various zones of the reactor chamber 202 (see FIG. 2).

After cleaning via the hot air 108, the input plastic may then be received by another hopper or other container 110 which may include or be coupled to one or more grinding component 112 (e.g., gears, burr grinders, or the like). The one or more grinding component 112 may shred the input plastic to reduce a size of the input plastic (e.g., an average diameter of the resulting shredded plastic, or a maximum dimension of the resulting shredded plastic). For example, the input plastic may be shredded to a size between about one eighth (⅛) of an inch and about one quarter (¼) of an inch (between about 3.2 millimeters (3.2 mm) and 6.4 mm). After shredding, the input plastic may be conveyed (e.g., by another conveyer 114) to another hopper or container 116 which may include or be coupled to a pelletizer 118. The pelletizer 118 may pelletize the shredded input plastic into units of a desired size or range of sizes. For example, the pelletizer 118 may pelletize the input plastic into spheres or other shapes having an average diameter, a maximum diameter, or a maximum dimension of between about three eighths (⅜) of an inch and five eighths (⅝) of an inch (9.5 mm and 16 mm).

The pelletized input plastic may then be conveyed (e.g., using another conveyer 120) into another hopper or container 122 which may include or be coupled to a scale 124 (e.g., a digital scale or other device capable of detecting or measuring a weight or mass of the pellets). The scale 124 may determine a mass of the pellets to be used for various purposes. For example, the determined mass may be used by a controller 128 when controlling various inputs of the pre-conditioning system 100 or the system 200, may be used to assign credits to entities for processing or destroying the input plastic, may be used to troubleshoot the system 100 or the system 200, or the like. An additional sensor 126 may detect additional information regarding the pelletized plastic such as temperature of the pellets or the environment, types of plastics or contaminants, a size of the pellets, a flow of the pellets through the pre-conditioning system 100, a humidity of the environment of the pre-conditioning system 100, an amount of radiation emanating from the pellets, or the like. In that regard, the sensor 126 may include, for example, an imaging sensor, a temperature sensor, a radiation sensor, a proximity sensor, a pressure sensor, a position sensor, a photoelectric sensor, a particle sensor, a motion sensor, a metal sensor, a mass spectrometer, a level sensor, a leak sensor, a humidity sensor, a chemical sensor, a force sensor, a flow sensor, a flaw sensor, a flame sensor, an electrical sensor, a contact sensor, a non-contact sensor, or the like. The information from at least one of the scale 124 or the additional sensor 126 may be provided to the controller 128 where it may be stored in a database, may be used in a calculation or other data entry, may be used to control operation of the pre-conditioning system 100 or the system 200, or the like.

After having one or more characteristics detected by the scale 124 or the additional sensor 126, the pelletized plastic may be conveyed (e.g., via another conveyer 130) to another hopper or other container or element 132 which may be coupled to the reactor chamber 202. In that regard, the hopper or other element 132 may be part of, or be coupled to, the system 200. In some embodiments, the hopper or other element 132 may not exist such that the pelletized material may be conveyed directly to the system 200. In some embodiments, the material may be processed by the system 200 without any pre-conditioning, or with any one or more of the pre-conditioning steps eliminated.

Pyrolysis

After pre-conditioning by the system 100 and referring to FIGS. 1 and 2, the pelletized material may be ready for further processing by the system 200 (e.g., in the reactor chamber 202). The conveyer 130 or other component may be used to move the pelletized material to the hopper 132 (or directly to an auger 204) where the auger 204 of the system 200 may force the pelletized material into the reactor chamber 202. The auger 204 may be referred to as a hopper auger (as it receives the pellets from the hopper 132) or an input auger (as it receives the pellets as inputs to the system 200). Another reactor auger 208 may drive the input plastic through the reactor chamber 202. In some embodiments, a funnel 206 may be coupled to the hopper or input auger 204 and may funnel the plastic pellets into the reaction chamber 202 (e.g., into a location in the reactor chamber 202 in which the reactor auger 208 may drive the plastic through the reactor chamber 202).

Although the system 200 may properly process input plastics without pelletizing the input plastic, the pelletizing process may provide advantages over use of non-pelletized input plastics. In some embodiments, the input plastics may be shredded and mixed together prior to pelletizing, causing plastics with different melting and vaporizing temperatures (e.g., temperatures at which pyrolysis occurs) to transfer heat through plastic-to-plastic contact using conduction. For example, within a pellet containing low-melting-point plastic and high-melting-point plastic, the low-melting-point plastic will begin to liquify at a lower temperature, which will more efficiently conduct thermal energy to the plastic particles with a higher melting point. Heat transfer through this contact conduction may be significantly more efficient than transferring heat through a secondary surface (e.g., an inner surface of the reactor chamber 202). The heated fluid 310 (e.g., molten salt) provides the opportunity for the mixed plastic pellets to have direct contact with additional plastic within the pellets, thereby transferring heat using conduction. Thus, the pelletizing of the shredded mixed plastics may result in plastics with a relatively low melting temperature converting into liquid (or vapor or gas) while being in direct contact with other plastic in the same pellet having a greater melting temperature, resulting in the heat transfer mechanism of conduction throughout the cross-section of the pellet. Furthermore, pelletizing of the raw input plastic may allow for easier handling and weighing of the processed plastics, and may assist users when applying for plastic carbon credits.

Referring to FIGS. 2 and 3 and in some embodiments, the reactor chamber 202 may have at least three zones 224, 226, 228, 230, 232 which progressively heat the pelletized plastic material to increasing temperatures that are sufficiently great so as to cause pyrolysis of the input plastic. In that regard, the input plastic may be vaporized into condensable vapors and non-condensable gasses by the various zones 224, 226, 228, 230, 232. The reactor chamber 202 may have a reactor body 203 that encloses various portions of the reactor chamber 202. For example, the reactor body 203 may enclose the zones 224, 226, 228, 230, 232, the reactor auger 208, or the like. The components of the reactor chamber 202 (e.g., the reactor body 203 and the reactor auger 208, or any additional or alternative portions of the system 200 that are exposed to the temperatures within the reactor chamber 202) may be built from steel, ceramic, or another material, combination of materials, compound, or alloy that is capable of withstanding temperatures of at least 1,000 degrees F., 1,200 degrees F., 1,500 degrees F., or the like (538 degrees C., 649 degrees C., 816 degrees C.). Capable of withstanding these temperatures may mean that the material or materials of the reactor chamber 202 may experience (or be exposed to) these temperatures for periods of time (e.g., minutes, hours, days, or the like) without deformation, degradation of materials, melting or vaporization, changes in material properties, other undesirable reactions, or the like. Stated differently, the reactor chamber 202 and other components of the system 200 may continue to operate while constantly exposed to these extreme temperatures without degrading, deforming, or experiencing otherwise undesirable effects.

During process start-up, a nitrogen blanket may be employed within the volume 314 of the reactor chamber 202 to purge the reactor chamber 202 of oxygen, creating a positive-pressure, inert atmosphere within the reactor chamber 202. That is, nitrogen or another inert gas (gasses that fail to react with (e.g., combust) elements in the reactor chamber 202, e.g., argon, neon, radon, helium, or the like) may be released into the volume 314 to purge oxygen from the reactor chamber 202 and to cause pressure within the volume 314 to be greater than an ambient pressure of the environment of the system 200. Causing the pressure within the volume 314 to be greater than the ambient pressure of the environment reduces the likelihood of ingress of oxygen into the volume 314, thus reducing the likelihood of undesirable reactions within the reactor chamber 202. In some embodiments, the fluid 310 may not be heated (or heated fluid 310 may not be provided within the reactor chamber 202) until after the oxygen is purged from the reactor chamber 202. In some embodiments, the fluid 310 may be heated but plastic pellets may not be provided to the reactor chamber 202 until the oxygen is purged from the reactor chamber 202. For example, the hopper or input auger 204 may only begin driving plastic pellets into the reactor chamber 202 (and the reactor auger 208 may only drive the input plastic through the reactor chamber 202) after the oxygen has been purged. Gases and vapors resulting from the ongoing pyrolysis reaction may maintain the positive pressure within the reactor chamber 202 after the pyrolysis reaction begins.

In some embodiments, the pressure sensor 234 and controller 128 may monitor and regulate various controls of the reactor chamber 202. For example, the controller 128 may be programmed to ensure that the pressure within the reactor chamber 202 remains above a threshold pressure value. The controller 128 may continuously, periodically, or from time to time monitor the pressure within the reactor chamber 202 using the pressure sensor 234 and may control various input parameters of the system 200 based on the detected pressure. The input parameters which the controller 128 are capable of controlling may include, for example, a speed of various augers (e.g., the hopper or input auger 204, the reactor auger 208, the contaminant auger 214, components of the pre-conditioning system 100), a temperature of the various zones 224, 226, 228, 230, 232 of the reactor chamber 202, flow of nitrogen or other inert gas into the reactor chamber 202, a flow of catalyst into the reactor chamber 202, or the like. In some embodiments, the controller 128 may determine (e.g., in communication with one or more additional sensors) additional or alternative values within the system 200 (e.g., a quantity of vapors, gases, biochar, contaminants, etc. generated by the pyrolysis, temperatures within each of the zones 224, 226, 228, 230, 232, a quality of the heated fluid 310, types of vapors and gases that are generated by the pyrolysis, or the like), and may control various input parameters of the system 200 based on the detected values within the system.

In some embodiments, the controller 128 may also monitor various values within the pre-conditioning system 100 of FIG. 1 and may control various parameters of at least one of the system 100 or the system 200 based on the monitored values within at least one of the system 100 or the system 200. For example, the controller 128 may control a rate at which the pre-conditioning system 100 generates plastic pellets based on detected values within the system 200. In some embodiments, the pre-conditioning system 100 may be separate from the system 200 such that operation of the system 100 fails to affect operation of the system 200.

Figure 4:
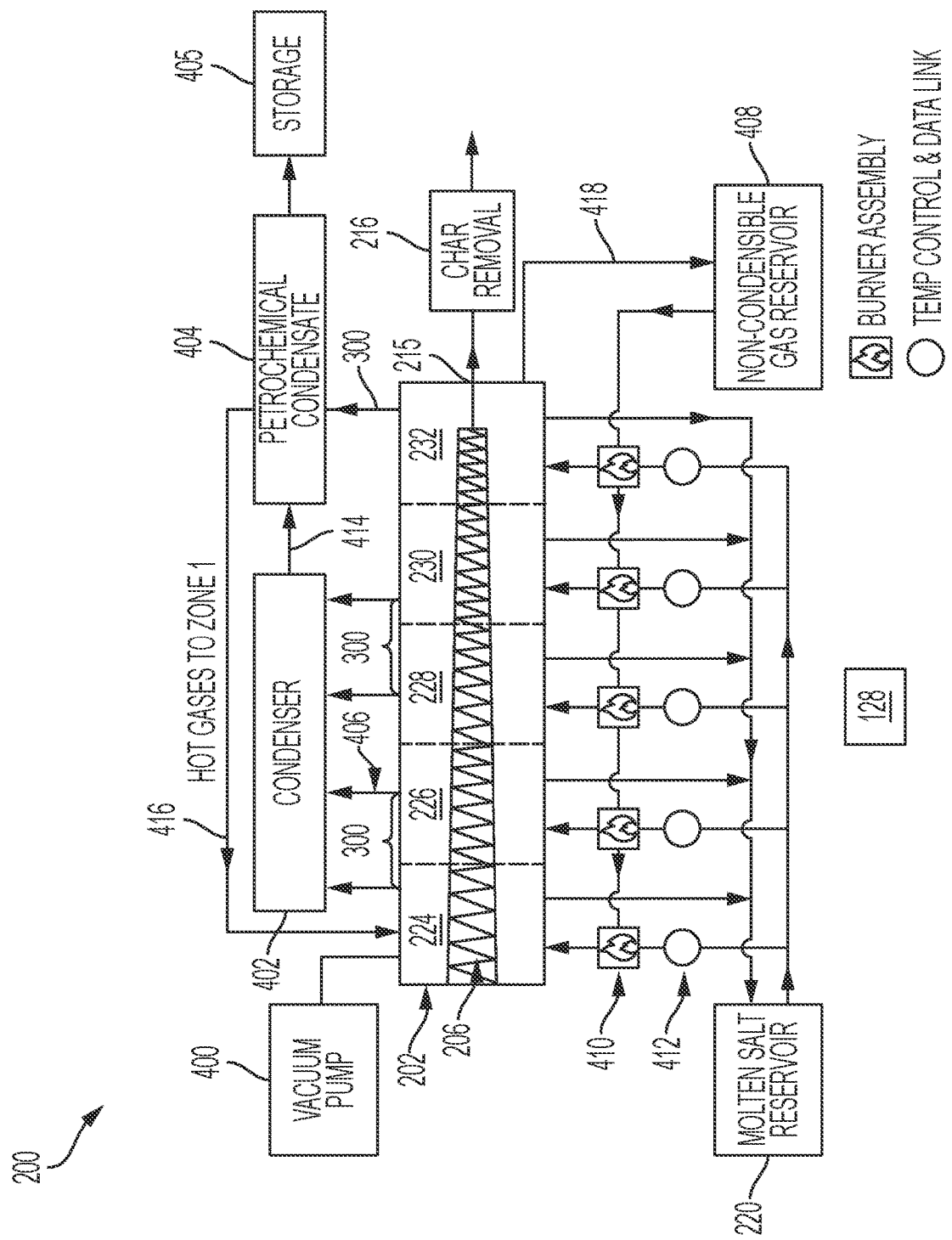
FIG. 4 is a system diagram illustrating various components of the system of FIG. 2 along with additional components, according to some embodiments of the present disclosure.

Referring to FIGS. 2-4, the input plastic may be driven through the zones of the reactor chamber 202 consecutively, starting with the first zone 224. For example, the input plastic may be driven through the zones using at least one of the hopper or input auger 204 or the reactor auger 208. While moving through the reactor chamber 202, the plastic is consecutively exposed to the temperatures in each of the zones 224, 226, 228, 230, 232 (the temperatures being achieved via the heated fluid 310) with the plastic being exposed to greater temperatures as it proceeds from zone to zone through the reactor chamber 202. In some exemplary embodiments, the various zones may be designed to expose the plastics to the following temperature ranges:

Zone 1: between about 200 and 300 degrees F. (between about 93 and 149 degrees C.);
Zone 2: between about 300 and 450 degrees F. (between about 149 and 232 degrees C.);
Zone 3: between about 450 and 650 degrees F. (between about 232 and 343 degrees C.);
Zone 4 between about 650 and 850 degrees F. (between about 343 and 454 degrees C.); and
Zone 5: between about 850 and 1112 degrees F. (between about 454 and 600 degrees C.).

In some embodiments, the reactor chamber 202 may include greater or fewer zones than shown, the temperature ranges within each zone may be different, or the like. For example, the reactor chamber 202 may include a first zone in which the plastics are exposed to temperatures of between about 77 degrees F. and 230 degrees F. (between about 25 and 110 degrees C.), a second zone in which the plastics are exposed to temperatures of between about 230 degrees F. and 850 degrees F. (between about 230 and 454 degrees C.), and a third zone in which the plastics are exposed to temperatures of between about 850 degrees F. and 1112 degrees F. (between about 454 and 600 degrees C.).

The zones may or may not be separated within the reactor chamber 202. In that regard, a zone may generally refer to a portion of the reactor chamber 202 in which the plastics are exposed to temperatures within a predetermined range, and the length of the zones may change as the temperature of the heated fluid changes. For example, an input end of the reactor chamber 202 (i.e., an end that receives the input plastics) may expose the plastics to a temperature that is less than about 300 degrees F. (about 149 degrees C.), a location towards an output end of the reactor chamber 202 (i.e., an end that is opposite the input end) may expose the plastics to a temperature of at least about 850 degrees F. (about 454 degrees C.), and the plastics may be exposed to temperatures of between about 300 degrees F. and 850 degrees F. (between about 149 degrees C. and 454 degrees C.) between the input end and the output end. In that regard, the location at which the plastics are exposed to temperatures that are less than 300 degrees F. may be regarded as a first zone, the location at which the plastics are exposed to temperatures that are at least 850 degrees F. may be regarded as a third zone, and locations between the first zone and the second zone may be regarded as a second zone. It may be desirable for the plastics to be exposed to temperatures (e.g., via zones) in a way that causes the plastics to be exposed to increasingly greater temperatures as they pass through the various zones.

For example, the heated fluid 310 may be heated to a temperature that is within the ranges provided above such that the input plastic is exposed to the temperatures via contact with the heated fluid 310. In some embodiments, the heated fluid 310 may be present through the reactor chamber 202 up to a halfway point 222 along a height of the reactor body 203. In some embodiments, the heated fluid 310 may extend above or below the halfway point 222. The input plastic to be processed may generally float or rest at or near the surface of the heated fluid. However, material that has been converted to vapors and gases may move away from the heated fluid 310 and flow out of the reactor chamber 202 via the apertures 300. Also, heavy contaminants may fall through the heated fluid 310 towards the sump 212. Thus, the material that remains at or near the surface of the heated fluid is plastics which have yet to experience pyrolysis or which have melted but not yet converted to vapors or gases.

In some embodiments, the reactor chamber 202 may include chemical compounds with the heated fluid 310 for various purposes (e.g., to achieve desired reactions such as neutralizing acids within the reactor chamber 202, to catalyze the pyrolysis process, or the like). The system 200 may produce two types of acids: organic hydrocarbon acids (e.g., phthalic and benzoic acids) and inorganic acids (e.g., hydrochloric and bromic acids). In some embodiments, the organic acids may be allowed to remain with the condensed oil products since many refineries are designed to accept and mitigate organic acids. The system 200 may be designed to treat the inorganic acids to produce inorganic salts. These inorganic salts may then be filtered out from the heated fluid 310.

For example, a potentially problematic halogen which may be created in the reactor chamber 202 is chlorine (which may result from polyvinyl chloride, PVC). PVC may have a two-step decomposition process: a first step between about 410 degrees F. and 662 degrees F. (210 degrees C. and 350 degrees C.) and a second step at about 662 degrees F. (350 degrees C.). In the first step, the PVC melts and, as it vaporizes, it releases chlorine gas which may combine with available hydrogen ions to yield hydrochloric acid, which is corrosive and may reduce the quality of the resulting oil if left to condense with the oil. The system 200 may be designed to include calcium carbonate which may have a greater density than the heated fluid 310. The reactor auger 208 may blend the calcium carbonate with the liquid and vaporizing plastics because of actuation, causing a reaction between the calcium carbonate and the chlorine gas. This reaction results in an inorganic salt (calcium chloride) to form which may have a density that allows it to mix completely with the heated fluid 310, and thus allows for later removal from the system 200. The system 200 may also be designed to include buckminsterfullerene, commercially available as "Bucky Balls". This buckminsterfullerene may be included in the reactor chamber 202, for example, in the first and second zones 224, 226. This buckminsterfullerene includes a structure of 30 carbon to carbon double bonds and has the ability to trap 34 free radicals, allowing it to trap problem compounds and further mitigate the chlorine gas.

The system 200 may further include nanotubes (e.g., carbon nanotubes) added to the reactor chamber 202 in the first and second zones 224, 226 which may help catalyze the oxidation reaction of napthenic hydrocarbons from the diesel fraction. These nanotubes may have open bonds at their ends thereof which may snip at the relatively large hydrocarbons, thus reducing a size of the relatively large hydrocarbons. This reduction in size may reduce the temperature at which the hydrocarbons experience pyrolysis (e.g., the temperature at which the hydrocarbons experience pyrolysis may be reduced by about 180 degrees F. (100 degrees C.)); thus, the addition of the nanotubes may assist the pyrolysis process.

As a note, the buckminsterfullerene, the nanotubes, and the biochar formed by the system 200 are all carbon-based substances and may exit the reactor chamber 202 together (e.g., with the biochar as discussed elsewhere). For example, the buckminsterfullerene, the nanotubes, and the biochar may all have a similar density (which is greater than the heated fluid 310) and thus these products may all exit the reactor chamber 202 together. At a later point in time, this mixture may be treated in a cylindrical furnace (e.g., at about 2,600 degrees F. (1,427 degrees C.)) to refresh their properties. Once refreshed, the mixture may be readded to the system 200, or may be sold as organic biochar or other biochar products.

The temperature of the heated fluid 310 in each zone may be selected based on physical properties for each type of plastic that may be processed by the system 200. For example, the temperatures may be selected based on the melting and boiling points, the pyrolysis properties, the heat transfer properties, or the like for each type of plastic. It may be desirable to cause the input plastic to change relatively slowly from solid to liquid and then from liquid to vapor as the resulting vapor may be reconstituted back into an oil. On the other hand, if the plastics heats too quickly then it may decompose and become a non-condensable gas which is unable to be reconstituted back into an oil. Thus, the progressive increase in temperatures throughout the reactor chamber 202 may be designed to maximize the resulting condensable vapor from the system 200. For example, this may be achieved by allowing the condensable vapors to leave the reactor chamber 202 at a sufficiently low temperature to allow for extraction of a maximum quantity of oil.

The system 200 may include a reservoir 220 in which the heated fluid 310 may be stored. In some embodiments, the heated fluid 310 may flow freely between the reservoir 220 and the various zones 224, 226, 228, 230, 232. In some embodiments, the heated fluid 310 may flow freely between adjacent zones 224, 226, 228, 230, 232. In some embodiments, barriers may be erected between adjacent zones that restrict or otherwise prevent the heated fluid 310 from flowing therebetween. In some embodiments, the system 200 may include one or more design feature that cycles the heated fluid 310 through the system 200. In some embodiments, the heated fluid 310 may flow from the reservoir 220 into the first zone 224 and then through the subsequent zones 226, 228, 230, 232 and finally from the last zone 232 back into the reservoir. In some embodiments, the heated fluid 310 may flow from the reservoir 220 into the last zone 232, through the remaining zones in reverse order 230, 228, 226, 224 and finally from the first zone 224 into the reservoir 220. For example, the system 200 may include a pump (e.g., a centrifugal pump, a jet pump, a piston pump, or the like) that causes the heated fluid 310 to flow through the system 200 in a designed pattern. In some embodiments, the heated fluid may not be forced to flow through the system 200 but may migrate through the system 200 at will, or as a result of the various augers 204, 208.

The system 200 may include a plurality of heating elements 410 (e.g., burners designed to burn combustible materials to generate thermal energy, or electrical heaters configured to convert electrical energy into thermal energy) designed to heat the heated fluid 310, and temperature sensors 412 designed to detect the temperature of the fluid or the ambient environment within each of the zones 224, 226, 228, 230, 232. In some embodiments, the system 200 may include a single heating element 410 for each zone, may include multiple heating elements 410 for each zone, may include a single heating element 410 in one or more zone and multiple heating elements 410 in other zones, or the like. In some embodiments, one or more heater may also be located in such a way so as to heat the fluid in the reservoir 220, for example, to ensure that molten salt remains molten. In some embodiments, one or more heating elements 410 may be located in such a way so as to heat the heated fluid 310 in intermediate sections of the system 200 (e.g., in piping between the reservoir 220 and the zones 224, 226, 228, 230, 232); such placement of heating elements 410 may reduce the likelihood of undesirable freezing or cooling of the heated fluid 310 that is sufficient to cause the heated fluid 310 to solidify.

Similarly, the system 200 may include a single temperature sensor 412 for each zone, may include multiple temperature sensors 412 for each zone, may include a single temperature sensor in one or more zone and multiple temperature sensors 412 in other zones, or the like. The controller 128 may monitor the temperature in each of the zones 224, 226, 228, 230, 232 based on data detected by each of the temperature sensors 412. The controller 128 may also control operation of each of the heating elements 410 based on the monitored temperatures within the zones 224, 226, 228, 230, 232. In particular, the controller 128 may control the heating elements 410 to increase or decrease heat production based on the detected temperatures within the zones 224, 226, 228, 230, 232 to cause the temperatures in each zone to remain within the designed temperature range. In some embodiments, each zone may include its own heating element 410 to cause the heated fluid 310 within each zone to reach the desired temperature range. The heated fluid 310 may be heated externally relative to the reactor chamber 202 and cycled into the zones as needed, or may be heated within the zone in the reactor chamber 202. In some embodiments, the heated fluid 310 may be designed to flow through the zones subsequently (i.e., from the first zone 224 to the second zone 226, from the second zone 226 to the third zone 228, etc.), and the heating elements 410 may be designed to increase the temperature of the heated fluid 310 as it flows through later zones, thus causing the temperature of the fluid to increase as it flows downstream through the reactor chamber 202. In some embodiments, the heated fluid 310 may be designed to flow through the zones in a backwards order (e.g., from the fifth zone 232 to the fourth zone 230, from the fourth zone 230 to the third zone 228, etc.) such that less heat is required to achieve the desired temperature in each previous zone.

The pyrolysis process thermally decomposes the plastics to produce liquids, condensable vapors, and non-condensable gases composed of various petroleum and petroleum products. In some embodiments, the liquids may further decompose into at least one of condensable vapors or non-condensable gases in response to at least one of exposure to greater temperatures or longer exposure to current elevated temperatures. In some embodiments, the pyrolysis process may also produce off gases (e.g., flue gases occurring as a result of combustion of off gases). The off gases may be ported to a location in the system 100 or the system 200 for use (e.g., may be used as the hot air 108 in the system 100 of FIG. 1 or may be fed to a turbine to drive a generator to generate electricity).

The condensable vapors produced by the pyrolysis process may be condensed (e.g., into oil or another petroleum product) and may then be available for reuse (e.g., burned as fuel, sold, or used as raw material to make new products). In that regard, apertures 300 may be located along a top surface of the reactor body 203. In some embodiments, the system 200 may include at least one aperture 300 in each of the zones 224, 226, 228, 230, 232, and in some embodiments, may include multiple apertures 300 in each zone. The condensable vapors (and non-condensable gases) may flow out of the reactor chamber 202 through the apertures 300 as shown by arrows 406.

In some embodiments, the pressure of the pyrolysis reaction within the reactor chamber 202 may be sufficient to urge or expel the vapors and gases through the apertures 300 without any additional elements assisting with the flow of vapors and gases out of the reactor chamber 202 (e.g., without any additional pumps and without a flow of inert gases into the reactor chamber 202). In some embodiments, one-way valves may be positioned between the reactor chamber 202 and a location downstream from the reactor chamber 202 (e.g., between the reactor chamber 202 and a condenser 402) that allow fluid to flow downstream from the reactor chamber 202 but not back into the reactor chamber 202. However, in some embodiments, the system 200 may include one or more pump 400 (e.g., a positive pressure pump or a vacuum pump) that pumps the vapors and gases out of the reactor chamber 202 and into the condenser 402. For example, the pump 400 may generate pressure within the reactor chamber 202 to urge the vapors and gases through the apertures 300, or may generate negative pressure within the condenser 402 to draw the vapors and gases through the apertures 300. In some embodiments, this flow may be a result of a density of the vapors and gases being less than a density of materials within the reactor body 203 combined with the increased pressure within the reactor chamber 202 resulting from the pyrolysis. In some embodiments, inert gases having a relatively high density (e.g., greater than at least a portion of the petroleum-based vapors and gases) may be ported into the reactor body 202 to assist the flow of the condensable vapors and non-condensable gases through the apertures 300.

The condensable vapors and non-condensable gases may be routed from the apertures 300 to a condenser 402. Each aperture 300 may be in fluid communication with the reactor chamber 202 and the condenser 402 such that all condensable vapors and non-condensable gases that exit the reactor chamber 202 flow to the condenser 402.

The condenser 402 may cause the condensable vapors to condense into a condensate 404 of petroleum and petroleum products (e.g., oils and other liquid petroleum and petroleum-based products). The condenser may reduce a temperature of the mix of condensable vapors and non-condensable gases. For example, the condenser 402 may reduce the temperature of the vapors and gases to a temperature below a boiling point of water (212 degrees F. or 100 degrees C.). This temperature reduction allows hydrocarbons within a specific range to condense into a condensate (i.e., a product in liquid form, e.g., oil). The temperatures at which the non-condensable gases condense are significantly lower than the temperatures at which the condensable vapors condense, and the temperature at which the condenser exposes the vapors and gases is between the temperature at which the vapors condense and the temperature at which the gases condense, thus causing the condensable vapors to condense and the non-condensable gases to remain in gaseous form. Due to the different forms of the condensed vapors (liquid) and non-condensed gases (still gases), the two products may be separated into the liquid form of the condensed vapors and the gaseous form of the gases.

The condensate 404 of petroleum and petroleum products may be ported out of the condenser 402 as shown by an arrow 414. In some embodiments, the condenser 402 may be in fluid communication with a storage container 405 (e.g., a tank or other container) such that the condensed petroleum and petroleum-based products flow into the storage container 405. The condensed petroleum and petroleum-based products may be removed from the system 200 via the storage container 405 where they may be reused or sold as petroleum products. In some embodiments, the condensed petroleum and petroleum-based products may constantly flow out of the condenser 402 or container 405 to a remote location for use or storage.

In some embodiments, the system 200 may include one or more valve that reduces the likelihood of products flowing backwards through the system 200 (e.g., one-way valves that resist fluid flow from the storage container 405 into the condenser 402, and from the condenser 402 into the reactor chamber 202). In some embodiments, the system 200 may include one or more valve that allows the storage container 405 to be isolated from the system 200 such that the petroleum products may be removed from the storage container 405 for sale or reuse elsewhere.

Certain compounds processed by the system 200 (e.g., certain non-condensable gases) may become waxes while exposed to the temperatures within the reactor chamber; it is desirable to reduce the likelihood of these waxes collecting on surfaces of the system 200, especially piping where they may cause a blockage or may reduce the flow of fluid therethrough. In some embodiments, the non-condensable gases that are received by the condenser 402 may be ported back into the reactor chamber 202 as shown by an arrow 416. In some embodiments, a condenser trap (e.g., a petrochemical condenser trap) may be used to trap waxy hydrocarbons to facilitate re-routing of the waxy hydrocarbons back into the reactor chamber 202. For example, the non-condensable gases may be routed through a chamber where the waxes are allowed to condense, and then the condensed waxes may be re-heated back into a gaseous state and then routed back into the reactor chamber 202. The non-condensable gases may include, for example, long-chain waxy hydrocarbons; by routing these long-chain waxy hydrocarbons back into the reactor chamber 202, their residence time in the reactor chamber 202 is increased to allow for their further depolymerization.

In some embodiments, at least a portion of these non-condensable gases may be routed to a reservoir 408 for storage or reuse elsewhere, as discussed in more detail below. In some embodiments, non-condensable gases that fail to flow through the apertures 300 may flow out of the reactor chamber 202 and to the reservoir 408 as shown by an arrow 418. In some embodiments, non-condensable gases that fail to condense in the condenser 402 may be routed to the reservoir 408. In some embodiments, the system 200 may include one or more filter for processing the non-condensable gases. For example, the filter may remove one or more component that is mixed with the gases. In some embodiments, the non-condensable gases may be bubbled through a calcium hydroxide solution to remove halogens. In some embodiments, the system 200 may include two filters such that one filter may treat the gases while the other filter is being regenerated.

Some plastics may include or produce waxes that have relatively high melting points and that can be vaporized but may recondense to become a relatively heavy wax again. It is undesirable to allow this recondensation into a heavy wax in portions of the system 200 in which they may clog one or more channel of the system 200 (e.g., apertures 300, a channel between the condenser 402 and container 404, or the like). In that regard, the relatively high temperature in the final zone 232 may depolymerize these long polymer chains and reduce the likelihood of recondensation into these waxes, thus reducing the likelihood of clogs caused by these waxes. Furthermore, time at elevated temperature also may assist with depolymerization. In that regard and in some embodiments, vapors and gases from the final zone 232 that fail to flow out of the reactor chamber 202 or fail to condense in the condenser 402 may be rerouted back to the first zone 224 (for example, as shown by an arrow 416) to increase the amount of time that these long polymer chains are exposed to elevated temperatures to further reduce the likelihood of wax formation clogging the system 200. In addition, the relatively high temperatures in the last zone 232 may also improve characteristics of the biochar that is created by the system 200.

The non-condensable gases may be separated from the condensed petroleum and petroleum products and burned as fuel, for example, to heat the heated fluid 310. In some embodiments, the system 200 may include a reservoir 408 to store the non-condensable gases. The non-condensable gases may be ported directly to the heating elements 410 or to the reservoir 408 for later porting to the heating elements 410, and may be burned as fuel by the heating elements 410 (e.g., burners) to heat the heated fluid 310.

In some embodiments, the non-condensable gases may be used in a generator to generate electricity. This electricity may be used to power at least a portion of the system 200 (or the system 100 of FIG. 1) or may be used to provide power elsewhere. In some embodiments, at least a portion of the flue gases may be ported to a turbine used to drive a generator to create additional electricity for powering the system 200 (or the system 100 of FIG. 1). In some embodiments, the heating elements 410 may include electric heating elements rather than fuel-powered heating elements, and the electricity generated by the non-condensable gases and the turbine may be used to power the electric heating elements.

In some embodiments, the system 200 may include sensors designed to detect resulting amounts of condensable vapors and non-condensable gases from the system 200. The controller 128 may monitor the sensor data and may adjust variable parameters of the system 200 if an undesirable amount of non-condensable gases are being created. The variable parameters that may be adjusted by the controller 128 may include, for example, a speed of the hopper or input auger 204, a speed of the reactor auger 208, a temperature of the heated fluid 310 in one or more of the zones, a volume of input plastic being fed into the hopper 132, a pressure within the reactor chamber 202, or the like.

It may be desirable to separate contaminants from the condensable vapors and the non-condensable gases. These contaminants may be at least one of removed from the system and discarded, converted to biochar, or the like. The contaminants may include heavy contaminants (e.g., having a density that is greater than a density of the heated fluid 310) and light contaminants (e.g., having a density that is less than a density of the heated fluid 310). For example, the heavy contaminants may include glass, certain metals, ceramics, etc., and the light contaminants may include aluminum foil; these contaminants may be coupled to or integrated with the input plastics received by the system 200. Organic contaminants (e.g., food waste) may be converted into the biochar in the reactor chamber 202.

As indicated above, the heated fluid 310 may include molten salt. For example, the heated fluid 310 may include sodium nitrate, lithium nitrate, or the like. Molten sodium nitrate may have a density of 141 pounds per cubic foot (141 lbs/ft$^3$, 2.26 grams per cubic centimeter (2.26 g/cm$^3$)). Accordingly, if molten sodium nitrate is used as the heated fluid 310, heavy contaminants may include materials that fail to flow out of the reactor chamber 202 via the apertures 300 and that have a density that is greater than 141 lbs/ft$^3$, and light contaminants may include materials that fail to flow out of the reactor chamber 202 via the apertures 300 and that have a density that is less than 141 lbs/ft$^3$. Use of molten salt as the heated fluid 310 allows molten plastic to float on the surface of the heated fluid 310 before the molten plastic is vaporized into condensable vapors and non-condensable gases. This in turn allows the vapors and gases to flow out of the apertures 300 towards the condenser 402. However, it may be desirable to avoid certain salts because these salts may create certain chemicals which may damage components of the system 200. Stated differently, it may be desirable for the molten salt (or other heated fluid) to be inert and to avoid converting into reactive (e.g., non-inert) substances in the system 200. For example, it may be desirable to avoid use of sodium chloride because sodium chloride may create chlorides which may corrode components of the system 200.

The system 200 may include features for managing the heavy and light contaminants by porting the heavy contaminants out of the system 200 and converting at least a portion of the light contaminants into biochar for use or sale. In particular, the reactor chamber 202 may include a cage 306 at least partially enclosing the reactor auger 208. As discussed above and in some embodiments, the heated fluid 310 may fill a bottom half of the reactor chamber 202 (i.e., may extend from a bottom of the reactor body 203 to a line 222 halfway up the reactor body 203). In some embodiments, the cage 306 may include a half cylinder that extends from the heated fluid 310 on one side of the reactor auger 208 to the heated fluid 310 on the other side of the reactor auger 208.

Input plastic 304 may remain within reach of (i.e., the distance from the centerline to the input plastic 304 may be less than or equal to a diameter of) the reactor auger 208 because of the cage 306 and the heated fluid 310. That is, the portion of the reactor auger 208 above the heated fluid 310 may be surrounded by the cage 306. The cage 306 may contain the input plastic and produced biochar which are floating on the heated fluid 310 as the reactor auger 208 forces the plastic materials through the progressively hotter zones of the reactor chamber 202. Thus, the cage 306 may resist upward separation of the solid plastic 304 from the reactor auger 208, and the greater density of the heated fluid 310 relative to the plastic 304 may resist downward separation of the plastic 304 from the reactor auger 208.

In some embodiments, the reactor auger 208 and the cage 306 may be cylindrical (i.e., may have a relatively constant diameter along their longitudinal axis). As some quantity of input plastic is converted to vapors and gases as it is forced through the reactor chamber, the reactor auger 208 and the cage 306 may instead have a shape that resembles a partial cone with a greater diameter in the earlier zones and a smaller diameter in the later zones (i.e., the diameter of the reactor auger 208 and the cage 306 may be greater at the first zone 224 than at the last zone 232). This conical shape allows the reactor auger 208 to force a greater quantity of plastic through the earlier zones than the later zones. In some embodiments, the conical shape of the reactor auger 208 and cage 306 may gradually taper down, and in some embodiments the conical shape may have steps (e.g., a diameter may be constant in the first zone 224 and may step down to a smaller diameter in each subsequent zone).

In some embodiments, the pitch of the reactor auger 208 (i.e., the distance between corresponding points on consecutive turns of the auger flighting, or the distance the conveyed material moves with one revolution of the auger) may remain constant along its length and, in some embodiments, the pitch of the reactor auger 208 may vary along its length. The pitch may be selected based on factors such as the expected volume of plastic being forced through each zone, the desired speed of the plastic through each zone, or the like.

The cage 306 may be formed to be permeable by vapors and gases such that condensable vapors and non-condensable gases 302 may flow upward through the cage 306 and exit the reactor chamber 202 via the apertures 300. In some embodiments, the cage 306 may allow liquid to flow therethrough, may resist flow of liquid, or may allow some liquid to flow and resist some liquid from flowing. The cage 306 may be formed from any material capable of withstanding temperatures within the reactor chamber 202. That is, the material of the cage 306 may be exposed to the temperatures within the reactor chamber 202 for significant periods of time without experiencing significant deformation, melting, or other undesirable physical effects. For example, the cage 306 may be formed using any of a family of oxidation-corrosion-resistant materials well suited for service in extreme environments subjected to pressure and heat which may include austenitic nickel-chromium-based superalloys, available under the trade name Inconel® from Special Metals Corporation of New Hartford, New York. The cage 306 may include a mesh design which includes openings or apertures that have a diameter sufficiently small to resist flow of solid plastic pieces and liquid plastic (as well as light contaminants and biochar) from flowing therethrough, such that the cage 306 resists separation of the solid and liquid plastic (as well as light contaminants and biochar) from the reactor auger 208. These design features allow the reactor auger 208 to urge all of the solid and liquid plastics as well as light contaminants and biochar through each of the zones of the reactor chamber 202.

As discussed elsewhere, the lighter contaminants resulting from the pyrolysis may be converted into biochar as a result of exposure to the relatively great temperatures within the reactor chamber 202. For example, these light contaminants may be converted into biochar while being urged through the reactor chamber 202 by the reactor auger 208. That is, because the light contaminants have a density that is less than a density of the heated fluid 310, the light contaminants remain above a top surface of the heated fluid 310 and are driven through the reactor chamber 202 by the reactor auger 208. In some embodiments, the relatively great temperature in the final zone 232 causes the biochar to be relatively light and fluffy (e.g., may reduce a density of the biochar relative to biochar exposed to lower temperatures which may have a greater density). For example, exposure of the input plastic and biochar to temperatures between about 850 to 1112 degrees F. (between about 454 and 600 degrees C.) may result in the biochar being less dense than the heated fluid 310. The reduced density of the biochar also results in the biochar being less dense than the heated fluid 310, such that the biochar rests above a top surface of the heated fluid 310. Causing the biochar to rest on or above a top surface of the heated fluid 310 results in easier collection and removal of the biochar from the system 200.

The mesh design of the cage 306 may also be sufficiently small so as to resist flow of biochar (formed by light contaminants) therethrough. In that regard, the cage 306 and the reactor auger 208 may be designed such that a vertical space may exist between the top of biochar formed within the cage 306 and a top surface of the cage 306. The vertical space may allow the biochar to be urged through the reactor chamber 202 by the reactor auger 208 without biochar flowing out of the cage 306 and into the surrounding zones. The vertical space may further allow vapors and gases formed within the cage 306 to flow freely out of the cage 306 without being backed up by a mass of biochar. That is, the space between the top of the biochar and the cage 306 reduces the likelihood of a mass of biochar clogging the cage 306 and resisting flow of the vapors and gases out of the cage 306.

The system 200 may include a mechanism 216 for removal of the biochar from the reactor chamber 202. In some embodiments, this mechanism 216 may exist at or near a longitudinal end of the reactor chamber 202 (e.g., at a distal end of the final zone 232). In some embodiments, the mechanism 216 may include a blade or edge located at or near the end of the reactor chamber 202 that is designed to move along a top surface of the heated fluid 310. This movement of the blade or edge along the top surface of the heated fluid 310 may "scrape," or urge, the biochar away from the heated fluid 310. For example, the blade or edge may force the biochar through a port 215 at an output end of the reactor chamber 202 (i.e., an end of the reactor chamber 202 that is opposite the input end, or end that receives the input plastics). The blade or edge, or another feature, may also be designed to actuate the biochar into a container or other volume where it may be removed from the system 200 and used or sold as desired. In some embodiments, the mechanism 216 may include at least one of a fan, particulate collection cyclone, dust bag removal system, or the like. The at least one of the fan, particulate collection cyclone, dust bag removal system, or the like may urge actuation of the biochar away from the heated fluid 310 (i.e., through a port 215 defined by the reactor chamber 202). The at least one of the fan, particulate collection cyclone, dust bag removal system, or the like may force the biochar towards a container from which it may be separated from the system 200 for use or sale, as desired. In some embodiments, the reactor auger 208 may push remaining material through a port 215 and a pipe-like housing to cause the char that formed during processing to be extruded into a char collection zone or container.

Because the cage 306 lacks a bottom portion, heavy contaminants 312 (which have a greater density than the heated fluid 310) may fall downward away from the reactor auger 208. That is, gravity may urge the heavy contaminants 312 towards a bottom of the reactor body 203. A sump 212 may be located along a bottom of the reactor body 203 and may extend along a length of the reactor body 203. In some embodiments, the sump 212 may only extend along a portion of the length of the reactor body 203 instead of the entire length of the reactor body 203. The heavy contaminants 312 may thus fall through the heated fluid 310 into the sump 212, and may settle in the sump 212. In some embodiments, the sump 212 (or the bottom of the reactor chamber 202) may have a shape that causes the heavy contaminants to settle at a central location (e.g., equidistant from circumferential ends of the sump 212 or reactor chamber 202) along the longitudinal axis of the sump 212 (or reactor chamber 202). The system 200 may include a contaminant auger 214 (e.g., located in the sump 212 or at a bottom of the reactor chamber 202) to drive the heavy contaminants through the sump 212 (or reactor chamber 202). Stated differently, the shape of the sump 212 (or reactor chamber 202) may be designed to cause the heavy contaminants to rest at the bottom of the sump 212 (or reactor chamber 202) at a radial location that is aligned with the axis of the reactor chamber 202.

The contaminant auger 214 may exist along a length of the sump 312 (and, thus, extend along a length of the reactor body 203) and may drive the heavy contaminants through the sump 212 to a location from which the heavy contaminants 312 may be removed from the system 200. For example, a depression in the sump 212 at or near an output end of the reactor chamber 202 may be designed to collect the heavy contaminants, such that the heavy contaminants may be removed from the depression. As another example, the reactor chamber 202 or sump 212 may define a contaminant port through which the contaminant auger 214 may drive the heavy contaminants. As yet another example, the heavy contaminants may settle at a bottom of the reservoir 220 and may be removed from the bottom of the reservoir. As another example, a container located at an end of the sump 212 may receive the heavy contaminants 312 from the sump 212. The container may be sealable from the sump 212 such that the container may be isolated from the sump 212 and the heavy contaminants removed and disposed of prior to replacing the container and deisolating the container from the sump 212.

Figure 5:
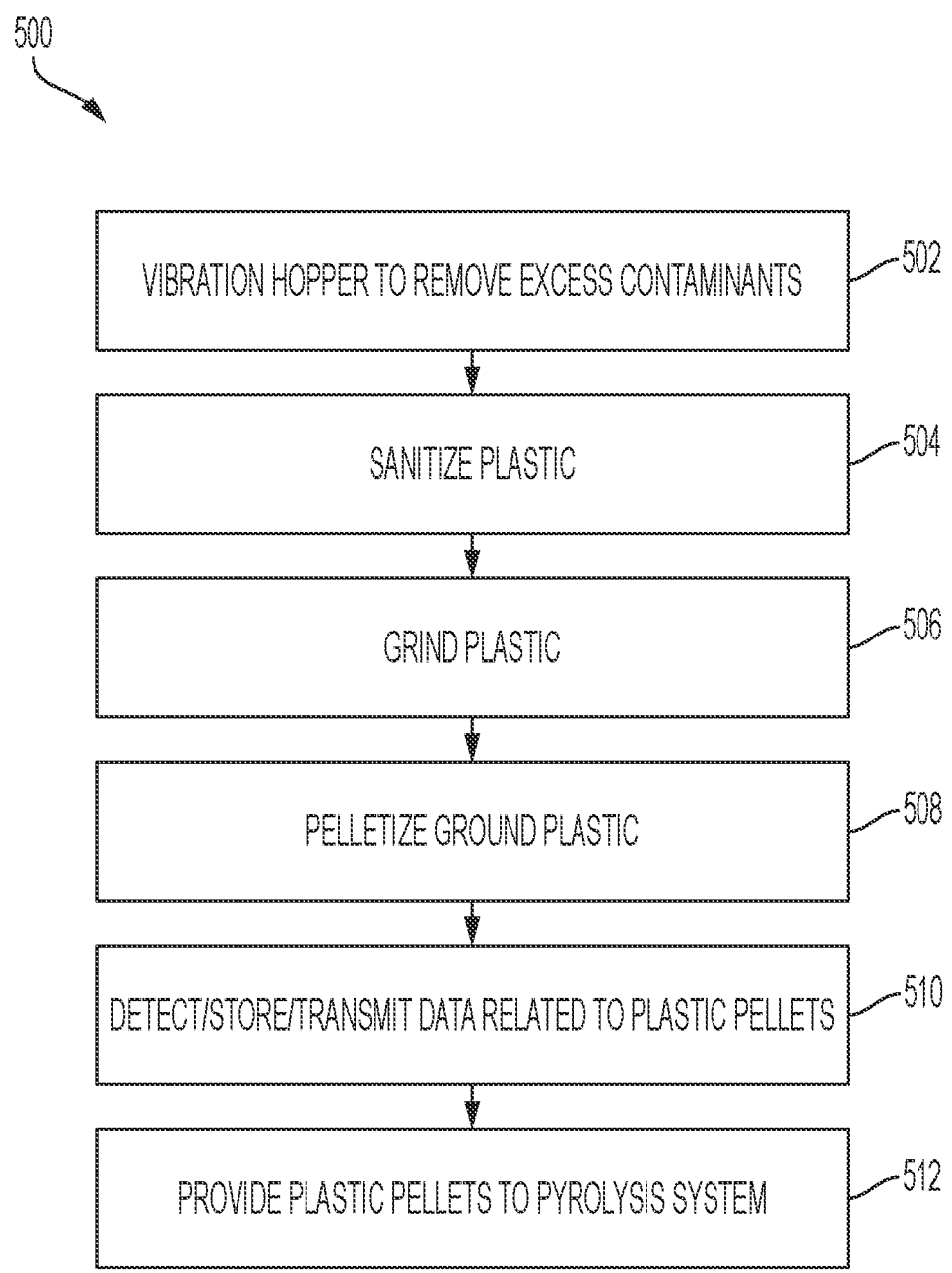
FIG. 5 is a flowchart illustrating a method for pre-conditioning mixed plastics before processing the plastics into petroleum and petroleum products, according to some embodiments of the present disclosure.

Referring to FIG. 5, a method 500 for pre-conditioning plastics to be processed using a pyrolysis process as described herein is shown. For example, the method 500 may be performed using a system similar to the system 100 of FIG. 1. The method 500 may begin in block 502 where input plastics (i.e., plastics to be processed) are provided to a vibration hopper. The vibration hopper may vibrate with the input plastics therein to remove excess contaminants (e.g., dirt, metals, water, other debris, or the like). In block 504, the plastics may be sanitized. For example, the plastics may be exposed to air or another gas that is heated to a relatively high temperature (e.g., between about 150 degrees F. and 250 degrees F. (65.6 degrees C. and 121 degrees C.)).

In block 506, the sanitized plastic may be ground or shredded (e.g., using a grinder) to pieces having a relatively small size (e.g., the input plastic may be shredded to have an average dimension, a maximum dimension, a diameter, or the like of between about one eighth of an inch and about one quarter of an inch (between about 3.2 millimeters (3.2 mm) and 6.4 mm)). In block 508, the shredded or ground plastic pieces may be pelletized. The size of the pellets may be selected based on parameters of the system in which the pellets will experience pyrolysis. For example, the plastics may be pelletized into spheres or other shapes having a diameter of between about three eighths of an inch and five eighths of an inch (9.5 mm and 16 mm).

In block 510, data corresponding to the pelletized plastic may be detected using one or more sensor. For example, a first sensor may detect a weight or mass of the plastic pellets, a second sensor may detect a size of the pellets, a third sensor may detect a flow rate of pellets being pelletized, a fourth sensor may detect a composition of the plastic pellets, or the like. This detected data may be transmitted to a controller. The controller may make determinations based on the detected data and may use the determined information to control various aspects of the pre-conditioning system (e.g., a speed at which plastics are input into the system, a size of the plastic shredded by the grinder, or the like). The controller may also or instead store the detected data in a local or remote memory, may transmit the detected data to a remote device (e.g., a cloud server, or a customer server, or a dedicated recording and monitoring system), or the like.

In block 512, the plastic pellets may be provided to a pyrolysis system after the measurements regarding the plastic pellets have been taken. For example, the plastic pellets may be automatically transported to a pyrolysis system (e.g., using a conveyer or other mechanism), may be carried or otherwise hauled to a pyrolysis system, may be put into storage for later processing, or the like.

Figure 6A:
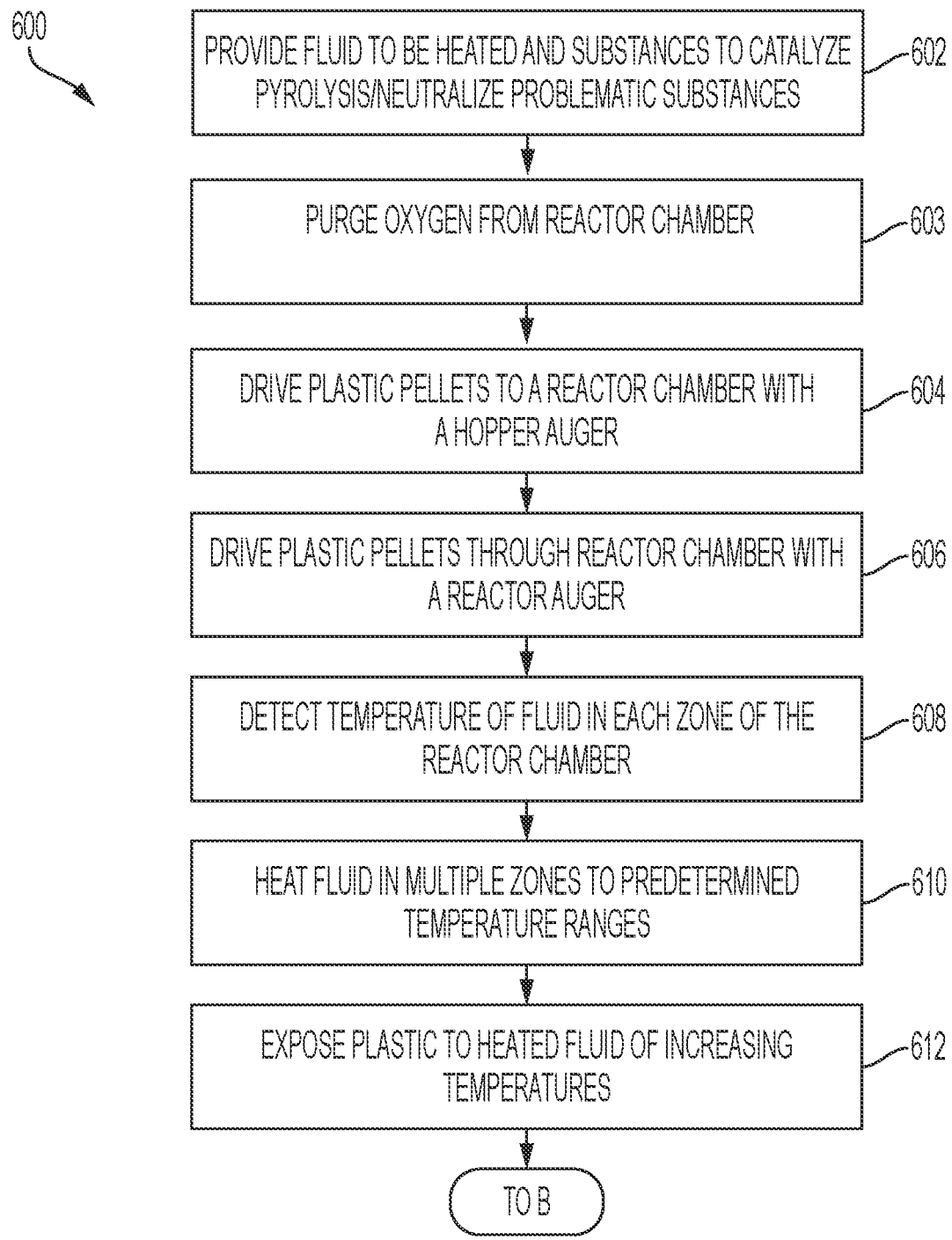
FIGS. 6A, 6B, and 6C are flowcharts illustrating a method for processing mixed plastic materials into petroleum and petroleum products, according to some embodiments of the present disclosure.
Figure 6B:
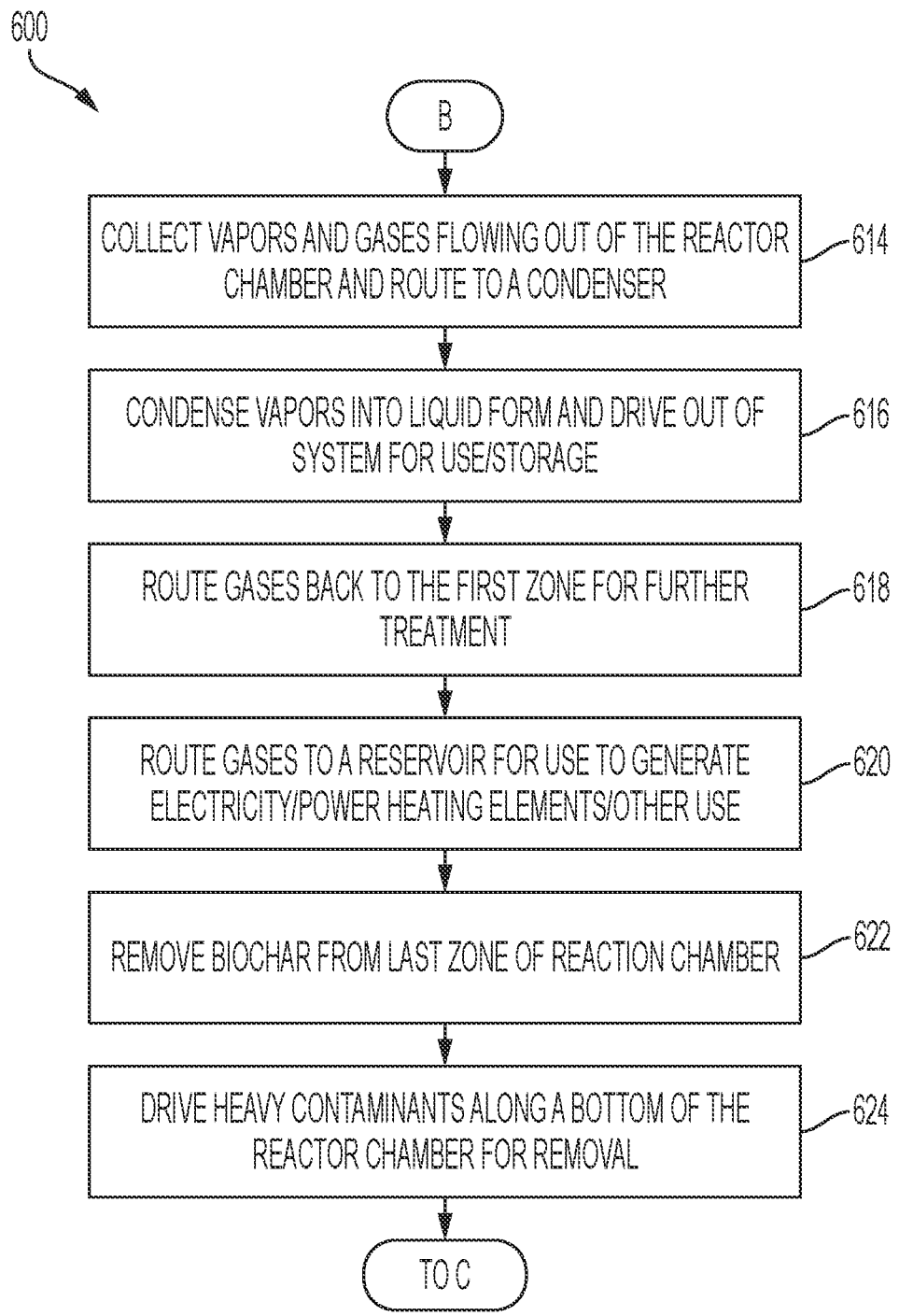
Figure 6C:
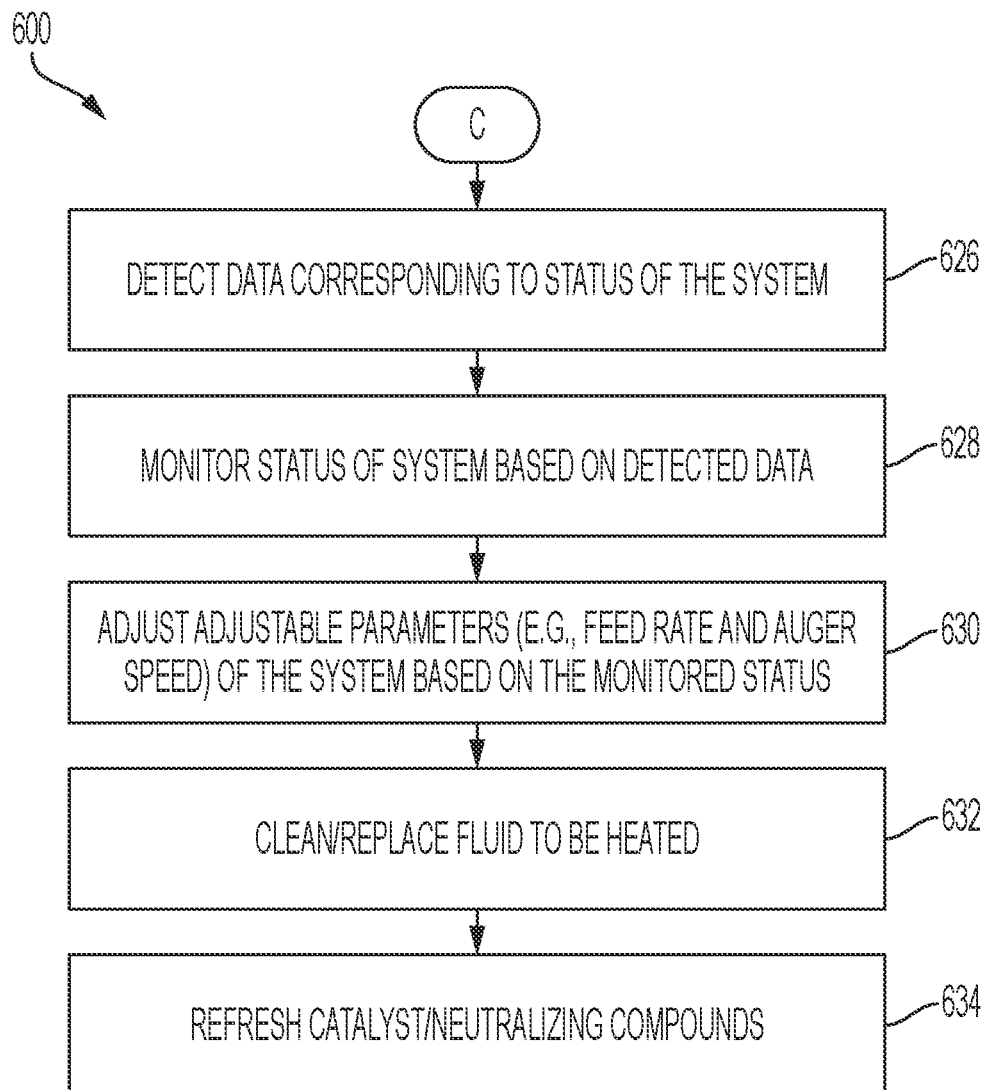

Turning to FIGS. 6A-6C, a method 600 for processing plastic materials is shown. The method 600 may be performed by a system similar to the system 200 of FIGS. 2-4. In some embodiments, the output materials of the method 500 of FIG. 5 may be used as input materials for the method 600. In block 602, a fluid (e.g., molten salt) or solid that may be converted into a fluid (e.g., solid salt) may be provided to a system. The fluid may be added to the system at a relatively low temperature (e.g., room temperature) and may be heated by the system, the fluid may be added to the system at an increased temperature, or the like. The heated fluid may be placed in contact with input plastics such that pyrolysis occurs to the input plastics that are exposed to the heated fluid. In some embodiments, the fluid may include additional additives that may act as catalysts for the pyrolysis process, the additives or additional additives may be added to neutralize problematic substances (e.g., acids), or the like.

In block 603, oxygen may be purged from a reactor chamber that is designed to receive plastic pellets and to cause a pyrolysis reaction with the plastic pellets. The oxygen may be purged from the reactor chamber before any plastics are exposed to increased temperatures. The purging may be performed, for example, by injecting nitrogen or another inert gas into the reactor chamber. A sufficient volume of nitrogen may be injected into the reactor chamber to ensure that all oxygen is purged from the reactor chamber. In some embodiments, the products of the pyrolysis may be sufficient to keep oxygen out of the reactor chamber (e.g., by maintaining a greater pressure in the reactor chamber than in an ambient environment of the reactor chamber). In some embodiments, additional nitrogen or another inert gas may be continuously or periodically injected into the reactor chamber to reduce the likelihood of ingress of oxygen at any point during processing. In some embodiments, a controller may monitor pressure within the reactor chamber (or may detect gases within the reactor chamber) and may inject additional nitrogen or other inert gases into the reactor chamber in response to the pressure dropping below a predetermined threshold pressure (or in response to detecting oxygen or other undesirable gases in the reactor chamber).

In block 604, plastic pellets may be driven into a reactor chamber of a plastic processing system (e.g., the system 200 of FIGS. 2-4). For example, the pellets may be driven through or from an input hopper (which may receive the plastic pellets from a pre-conditioning system) into a reactor chamber. In some embodiments, the pellets may be driven through or from any device capable of receiving or storing pre-processed plastic pellets.

In block 606, the plastic pellets may be driven through a reactor chamber. The reactor chamber may include a component that defines a volume in which fluid is heated to a relatively great temperature. The reactor chamber may include multiple zones of increasing temperatures such that the plastic pellets may be exposed to heated fluid of greater temperatures as it is driven further through the reactor chamber.

In block 608, one or more temperature sensor may detect data corresponding to a temperature of the heated fluid in each zone. A controller coupled to the temperature sensors may determine the temperature of the heated fluid in each zone based on the detected data. In block 610, the controller may control heating elements associated with the multiple zones to adjust the temperature of the heated fluid in each zone based on the determined temperatures. Each zone may be designed to hold fluid heated to a predetermined temperature range; the controller may increase or decrease the amount of heat generated by the heating element in order to cause the heated fluid to have a temperature that falls within the predetermined range for each zone.

In block 612, the plastic pellets and solid and liquid plastics that remain may be exposed to fluid of increasingly greater temperatures as the plastics are driven through the reactor chamber. The plastic pellets may be exposed to a first temperature range in the first zone in which certain plastics experience pyrolysis. The pyrolysis in each zone causes melting of some types of plastics and vaporization or gasification of other types of plastics. In that regard, the temperature range of each zone may be selected to cause pyrolysis of various types of plastics. For example, the temperatures of the first zone may cause pyrolysis of a first type of plastic, the temperatures of the second zone may cause pyrolysis of a second type of plastic, etc.

In block 614, condensable vapors and non-condensable gases may flow out of the reactor chamber. For example, apertures may exist along a top surface of the reactor chamber, and the vapors and gases may flow out of the reactor chamber via the apertures. For example, a pressure differential between the reactor chamber and the downstream side of the apertures may urge the vapors and gases to flow through the apertures. As another example, a pump or other device may encourage the flow of vapors and gases through the apertures. The vapors and gases may be routed towards a condenser after flowing out of the reactor chamber via the apertures.

In block 616, the condensable vapors that flow out of the reactor chamber may be condensed into liquid form. For example, a temperature of the vapors and gases may be reduced (e.g., by a condenser), thus causing the condensable vapors to condense into a liquid form. The liquid may be or may include one or more petroleum and one or more petroleum products (e.g., an oil). These petroleum and petroleum products in liquid form may be stored in a reservoir or routed to another container or external destination. The liquid petroleum and petroleum products may have a relatively high resale value and may thus be sold for future processing (e.g., for converting into gasoline or for creating new plastic products). The system may include reactants to which the condensable vapors are exposed in order to neutralize problematic substances therein to increase the quality (and thus resale value) of the liquid petroleum and petroleum products.

In block 618, at least a portion of the non-condensable gases that are separated from the condensed vapors may be routed back to the first zone of the reactor chamber. Routing the non-condensable gases back to the first zone allows the non-condensable gases to be at least partially exposed again to the increased temperatures for further processing.

In block 620, at least a portion of the non-condensable gases that are separated from the condensed vapors may be routed to a reservoir for later use. These gases may also include petroleum and petroleum products and may thus be combustible. In some embodiments, at least a portion of these non-condensable gases may be routed directly to a component for use without reaching a reservoir. For example, these non-condensable gases may be burned in a generator to generate electricity for powering at least a portion of the system 200, may be burned in a heating element (e.g., a burner) to heat the heated fluid, or the like. In some embodiments, the gases that are routed to the reservoir or for present use may be treated with at least one or more filter or one or more substance to increase efficiency of combustion of the gases.

The pyrolysis may also generate flue gases that lack combustible materials. In some embodiments, these flue gases may remain mixed with the non-condensable gases. In some embodiments, these flue gases may be separated from the non-condensable gases and used for alternative purposes. For example, the flue gases may be routed to a turbine that drives a generator to generate electricity to power components of the system. As another example, the flue gases may be used in the method 500 of FIG. 5 to sanitize the input plastics.

The pyrolysis process may generate light contaminants (e.g., contaminants having a density that is less than or equal to the density of the heated fluid) and heavy contaminants (e.g., contaminants having a density that is greater than or equal to the density of the heated fluid). The light contaminants may be converted to biochar as they are driven through the stages of the reactor chamber. Also, the last zone of the reactor chamber may be designed (e.g., the heated fluid in this zone may be controlled to have a sufficiently great temperature) to convert the remaining light contaminants into biochar. Furthermore, the design of the last zone may further treat the biochar to have desirable physical characteristics (e.g., may have a relatively light density and may be regarded as light and fluffy). In block 622, this biochar that exists at the end of the last zone may be removed from the reactor chamber. For example, the biochar may be scraped from a surface of the heated fluid. As another example, a pump may create a flow of gas that urges the biochar away from the heated fluid. The biochar may be routed to a reservoir or other container for storage. This biochar may then be sold or otherwise disposed of.

The heavy contaminants that result from the pyrolysis may fall or sink through the heated fluid (as a result of their density being greater than that of the heated fluid). In block 624, these heavy contaminants may be driven along a bottom of the reactor chamber for removal from the system. For example, a sump may be designed along the bottom of the reactor chamber in such a way that it collects the heavy contaminants as they settle along the bottom. A contaminant auger may be located in the sump and may drive the heavy contaminants along the sump (or along the bottom of the reactor chamber). These heavy contaminants may be removed from the sump/reactor chamber and the system using any known means. In some embodiments, the sump may have a design that is angled towards a near end or a far end (a proximal or distal end) such that gravity drives the heavy contaminants towards the near or far end of the sump for removal at the respective end.

In block 626, data corresponding to a status of the system may be detected by one or more sensor. For example, the system may include one or more sensor(s) that detects a composition of vapors and gases flowing out of the reactor chamber, a ratio of condensable (or condensed) vapors to non-condensable gases, a quantity of condensed liquid petroleum and petroleum products in a container, a quantity of biochar in a container, or a quantity of non-condensable gases in a reservoir. As additional examples, one or more sensor(s) may detect a speed of various augers used in the system, a feed rate of plastic pellets being provided to the system, a composition of plastic pellets being provided to the system, a quantity of heavy contaminants resulting from the pyrolysis, a temperature of the heated fluid in one or more location of the system, or a composition of the liquid petroleum and petroleum products generated by the system. As additional examples, one or more sensor may detect a quality or composition of the heated fluid, a level of the heated fluid within the reactor chamber, an amount of space between a top surface of the melted and solid plastics and a mesh cage, a speed of various pumps in the system, a flow rate of various materials in or through various portions of the system, or the like.

In block 628, the controller may monitor a status of the system based on the detected data. For example, the controller may operate a model of the system and may update the model based on the detected data. The controller may be designed to transmit an alert signal or adjust control of various components of the system in response to a detected parameter reaching or exceeding a predetermined threshold, or in response to the model indicating certain information.

In block 630, the controller may adjust one or more adjustable parameters of the system based on the monitored status (or directly based on the detected data from the sensors). The controller may be designed to adjust any one or more adjustable parameter of the system in order to optimize operation of the system (e.g., to maximize a ratio of condensable vapors to non-condensable gases, to optimize the quality of generated biochar, to minimize a quantity of resulting heavy contaminants, or the like). For example, the controller may be capable of adjusting a feed rate of the plastic pellets that are driven into the reactor chamber. The controller may be able to increase or decrease a flow of the pellets into the reactor chamber (e.g., by increasing or decreasing a rotational velocity of a hopper auger). As another example, the controller may be capable of adjusting a speed of the plastics through the various zones of the reactor chamber (e.g., by increasing or decreasing a rotational velocity of a reactor auger). As yet another example, the controller may be capable of increasing or decreasing a temperature of the heated fluid in each zone of the reactor chamber. The controller may be capable of adjusting any adjustable components of the system (e.g., flow rates of pumps, rotational velocities of augers, heat generated by heating elements, or the like). The controller may utilize the model to calculate ideal input parameters to achieve the desired results from the system.

After a period of time, the heated fluid may degrade or the quality of the heated fluid may other be reduced. For example, certain heavy contaminants or other materials may become mixed in with the heated fluid. In that regard and in block 632, the fluid to be heated may be cleaned or replaced. The fluid may be cleaned using any known means. Likewise, the fluid may be replaced using any known means. In some embodiments, new fluid (or new solids to be heated into a fluid form) may be added to the system while old fluid is removed during operation of the system. This may allow the system to continue processing plastics while simultaneously replacing poor quality fluid, increasing time during which plastics may be processed.

In block 634, at least one of catalyzing compounds or neutralizing compounds that were added to the heated fluid (e.g., to catalyze the pyrolysis or to neutralize acids) may be refreshed. For example, these compounds (or the heated fluid that includes these compounds) may be exposed to greater temperatures than those of the zones of the reactor chamber. In some embodiments, these compounds may be refreshed using any additional or alternative known techniques. In some embodiments, these compounds may be replaced instead of, or in addition to, the existing compounds being refreshed.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "some embodiments", "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system for processing plastics, the system comprising:
a reactor chamber configured to receive input plastics, having an input end designed to receive the input plastics and an output end opposite the input end, and being at least partially filled with a heated fluid such that the heated fluid has a greater temperature at the output end than at the input end, the heated fluid being heated to temperatures sufficiently great so as to cause pyrolysis of the input plastics to at least partially convert the input plastics into condensable vapors; and
a condenser configured to receive the condensable vapors from the reactor chamber and to condense the condensable vapors into a liquid condensate,
wherein:
the reactor chamber includes a heavy contaminant outlet located at a bottom of the reactor chamber and configured to allow heavy contaminants having a greater density than the heated fluid to exit the reactor chamber, and
the reactor chamber includes a light contaminant outlet located at or above a top surface of the heated fluid in the reactor chamber and configured to allow light contaminants having a lesser density than the heated fluid or products thereof to exit the reactor chamber.

2. The system of claim 1, wherein the light contaminant outlet in the reactor chamber at least one of includes or defines a port configured to receive char products and to separate the char products from the reactor chamber, the char products resulting from exposure of the light contaminants to the heated fluid in the reactor chamber.

3. The system of claim 1, wherein the reactor chamber includes at least three zones including a first zone in which the fluid is heated to a temperature of 350 degrees Fahrenheit (350 degrees F.) or less, a last zone in which the fluid is heated to a temperature of at least 800 degrees F., and a middle zone in which the fluid is heated to a temperature that is between 250 degrees F. and 900 degrees F.

4. The system of claim 3, wherein the middle zone includes a second zone in which the fluid is heated to a temperature that is between 300 degrees F. and 450 degrees F., a third zone in which the fluid is heated to a temperature that is between 450 degrees F. and 650 degrees F., and a fourth zone in which the fluid is heated to a temperature that is between 650 degrees F. and 850 degrees F.

5. The system of claim 1, further comprising a reactor auger located in and extending along a length of the reactor chamber, the reactor auger being configured to drive the input plastics through the reactor chamber.

6. The system of claim 5, wherein the reactor auger has a top and a bottom, and the top surface of the heated fluid is configured to be located between the top and the bottom of the reactor auger.

7. The system of claim 5, further comprising a mesh cage configured to at least partially surround the reactor auger at locations of the reactor auger located above the top surface of the heated fluid such that the input plastics remain between the mesh cage and the top surface of the heated fluid such that the reactor auger continues driving solid plastics through the heated fluid in the reactor chamber.

8. The system of claim 1, further comprising a contaminant auger located towards a bottom of the reactor chamber and configured to drive contaminants through the reactor chamber towards the heavy contaminant outlet.

9. The system of claim 1, further comprising at least one of:
  a generator configured to convert non-condensable gases generated by the pyrolysis into electricity, and electric heating elements configured to convert the electricity from the generator into thermal energy to heat the heated fluid; or
  fuel-powered heating elements configured to burn the non-condensable gases to generate the thermal energy to heat the heated fluid.

10. The system of claim 1, further comprising:
  at least one sensor configured to detect data corresponding to the system;
  an input auger configured to drive the input plastics into the reactor chamber and having an adjustable input auger rate to adjust a feed rate of the input plastics into the reactor chamber;
  a reactor auger located in and extending along a length of the reactor chamber, the reactor auger being configured to drive the input plastics through the reactor chamber and having an adjustable reactor auger rate to adjust a speed at which the input plastics are driven through the reactor chamber; and
  a controller coupled to the at least one sensor, the input auger, and the reactor auger and configured to adjust at least one of the adjustable input auger rate or the adjustable reactor auger rate based on the detected data.

11. A system for processing plastics, the system comprising:
  a reactor chamber configured to receive input plastics, having an input end designed to receive the input plastics and an output end opposite the input end, and being at least partially filled with a heated fluid that is heated to temperatures sufficiently great so as to cause pyrolysis of the input plastics to at least partially convert the input plastics into condensable vapors, wherein the heated fluid has a greater temperature at the output end than at the input end;
  a reactor auger located in and extending along a length of the reactor chamber, the reactor auger being configured to drive the input plastics through the reactor chamber;
  a condenser configured to receive the condensable vapors from the reactor chamber and to condense the condensable vapors into a liquid condensate; and
  a contaminant auger located towards a bottom of the reactor chamber and coaxially with the reactor auger and configured to drive contaminants through the reactor chamber to a location from which the contaminants may be removed from the reactor chamber.

12. The system of claim 11, wherein the heated fluid includes a molten salt such that:
  a first contaminant having a first density that is greater than a salt density of the molten salt falls through the molten salt towards the contaminant auger in the reactor chamber; and
  a second contaminant having a second density that is less than the salt density floats above the molten salt and is driven through the reactor chamber by the reactor auger.

13. The system of claim 12, further comprising a port configured to receive char products and to separate the char products from the reactor chamber, wherein the second contaminant converts into the char products in the reactor chamber.

14. The system of claim 11, wherein the reactor auger has a top and a bottom, and a top surface of the heated fluid is configured to be located between the top and the bottom of the reactor auger.

15. The system of claim 14, further comprising a mesh cage configured to at least partially surround the reactor auger at locations of the reactor auger located above the top surface of the heated fluid such that the input plastics remain between the mesh cage and the top surface of the heated fluid such that the reactor auger continues driving solid plastics through the heated fluid.

16. A system for processing plastics, the system comprising:
  a molten salt;
  a reactor chamber having an input end configured to receive input plastics and an output end opposite the input end, the reactor chamber being at least partially filled with the molten salt such that the molten salt has a greater temperature at the output end than at the input end, the input plastics having first contaminants and second contaminants; and
  at least one heating element configured to heat the molten salt to a temperature that is sufficiently great so as to cause pyrolysis of the input plastics received by the reactor chamber, the pyrolysis at least partially converting the input plastics into condensable vapors to be condensed into a liquid condensate,
  wherein:
    the molten salt in the reactor chamber is designed to separate according to a difference in density the first contaminants from the second contaminants, the second contaminants being converted to char in the reactor chamber as a result of the temperature of the molten salt,
    the reactor chamber includes a heavy contaminant outlet located at a bottom of the reactor chamber and configured to allow the first contaminants having a greater density than the molten salt to exit the reactor chamber, and
    the reactor chamber includes a light contaminant outlet located at or above a top surface of the heated fluid in the reactor chamber and configured to allow the second contaminants or products thereof having a lesser density than the molten salt or products thereof to exit the reactor chamber.

17. The system of claim 16, wherein at least a portion of the input plastics is provided as pellets that each include a mix of at least two types of plastics.

18. The system of claim 16, further comprising an outlet configured to receive at least a portion of the condensable vapors, and a port configured to route at least a portion of non-condensable vapors that flow through the outlet back into the reactor chamber for further exposure to heat in the reactor chamber.

19. The system of claim 16, further comprising a contaminant auger located towards a bottom of the reactor chamber and configured to drive the first contaminants through the reactor chamber towards the heavy contaminant outlet.

20. The system of claim 19, wherein the reactor chamber further defines a sump located along the bottom of the reactor chamber, wherein the contaminant auger is at least partially located in the sump and configured to drive the first contaminants through the sump.

* * * * *